US011961475B2

(12) United States Patent
Lee et al.

(10) Patent No.: US 11,961,475 B2
(45) Date of Patent: Apr. 16, 2024

(54) DISPLAY DEVICE AND METHOD OF DRIVING THE SAME

(71) Applicant: Samsung Display Co., Ltd., Yongin-Si (KR)

(72) Inventors: Min Ku Lee, Yongin-si (KR); Ji Hyun Ka, Yongin-si (KR); Won Kyu Kwak, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

(21) Appl. No.: 18/111,438

(22) Filed: Feb. 17, 2023

(65) Prior Publication Data

US 2023/0419900 A1 Dec. 28, 2023

(30) Foreign Application Priority Data

Jun. 22, 2022 (KR) ........................ 10-2022-0076453

(51) Int. Cl.
*G09G 3/3233* (2016.01)
*G09G 3/3266* (2016.01)

(52) U.S. Cl.
CPC ......... *G09G 3/3233* (2013.01); *G09G 3/3266* (2013.01); *G09G 2300/0819* (2013.01); *G09G 2300/0842* (2013.01); *G09G 2300/0861* (2013.01); *G09G 2310/0202* (2013.01); *G09G 2310/08* (2013.01); *G09G 2320/0233* (2013.01)

(58) Field of Classification Search
CPC ...... G06F 3/041–048; G06F 2203/041–04114; G06F 3/0416; G06F 3/0412; H10K 59/00–95; H10K 71/831; H10K 59/12; H10K 59/123; H10K 59/131; H10K 59/40; G09G 2310/08; G09G 2320/0252; G09G 2310/067; G09G 2310/062; G09G 2310/0213; G09G 2310/06; G09G 2320/0626; G09G 3/3208; G09G 2320/0242; G09G 2310/0232; G09G 2320/0686; G09G 2320/0257; G09G 2320/0209; G09G 2320/066; G09G 2320/0233
See application file for complete search history.

(56) References Cited

U.S. PATENT DOCUMENTS

| | | | |
|---|---|---|---|
| 8,816,944 | B2 | 8/2014 | Kim et al. |
| 9,424,793 | B2 | 8/2016 | Kitsomboonloha et al. |
| 10,467,958 | B2 | 11/2019 | Kim et al. |

FOREIGN PATENT DOCUMENTS

| | | |
|---|---|---|
| KR | 10-0635950 B1 | 10/2006 |
| KR | 10-2018-0029133 A | 3/2018 |

*Primary Examiner* — Sanjiv D. Patel
(74) *Attorney, Agent, or Firm* — Innovation Counsel LLP

(57) ABSTRACT

Provided is a display device including first pixels positioned in a first area of a panel for receiving a first data signal from a data line in response to a first scan signal supplied from a first scan line and having an emission time controlled according to a first emission control signal, and second pixel positioned in a second area of the panel for receiving a second data signal from the data line in response to a second scan signal supplied from a second scan line and having an emission time controlled by a second emission control signal. The first pixels receive the first data signal after a first time after the first emission control signal is supplied, and the second pixels receive the second data signal after a second time, which is different from the first time, after the second emission control signal is supplied.

20 Claims, 15 Drawing Sheets

210: 310a, 310b, 320a, 320b, 330, 340

210: 311a, 311b, 321a, 321b, 330, 340

DISPLAY DEVICE AND METHOD OF DRIVING THE SAME

CROSS-REFERENCE TO RELATED APPLICATIONS

This application claims priority to Korean Patent Application No. 10-2022-0076453, filed on, Jun. 22, 2022, and all the benefits accruing therefrom under 35 U.S.C. § 119, the content of which in its entirety is herein incorporated by reference.

BACKGROUND

1. Field

The present disclosure generally relates to a display device and a method of driving the same. More particularly, the present disclosure relates to a display device capable of allocating a sufficient time for touch sensing and improving display quality and a method of driving the same.

2. Description of the Related Art

A display device is being developed in a direction in which the display device includes an image display function and an information input function. The information input function of the display device may be generally implemented as a touch sensor for receiving a user's touch.

The touch sensor may be attached to one surface of a display panel implementing the image display function or may be integrally with the display panel to be used. A user may input information by pressing or touching the touch sensor while watching an image implemented on the display panel.

Meanwhile, a method capable of allocating a sufficient time to a touch sensing period to more accurately detect a touch input is required.

SUMMARY

An object of the disclosure is to provide a display device and a method of driving the same capable of allocating a sufficient time for touch sensing and improving display quality.

According to embodiments of the disclosure, a display device includes first pixels positioned in a first area of a panel, receiving a first data signal from a data line in response to a first scan signal supplied from a first scan line, and having an emission time controlled according to a first emission control signal, and second pixel positioned in a second area of the panel, receiving a second data signal from the data line in response to a second scan signal supplied from a second scan line, and having an emission time controlled by a second emission control signal. The first pixels receive the first data signal after a first time after the first emission control signal is supplied, and the second pixels receive the second data signal after a second time, which is different from the first time, after the second emission control signal is supplied.

According to an embodiment, the second time is set to be longer than the first time.

According to an embodiment, the first emission control signal and the second emission control signal are sequentially supplied.

According to an embodiment, the display device further includes a first emission driver sequentially supplying the first emission control signal to the first pixels through first emission control lines positioned in the first area with a predetermined time difference, and a second emission driver sequentially supplying the second emission control signal to the second pixels through second emission control lines positioned in the second area with the predetermined time difference.

According to an embodiment, a first emission control signal supplied to a last first emission control line positioned in the first area and a second emission control signal supplied to a first second emission control line positioned in the second area are sequentially supplied with the predetermined time difference.

According to an embodiment, the display device further includes a first scan driver supplying the first scan signal to a first scan line connected to the first pixels, and a second scan driver supplying the second scan signal to a second scan line connected to the second pixels.

According to an embodiment, a predetermined period after the first data signal is supplied to the first pixels positioned in the first area and before the second data signal is supplied to the second pixels positioned in the second area is an IFP touch sensing period.

According to an embodiment, the display device further includes third pixels positioned in a third area of the panel, receiving a third data signal from the data line in response to a third scan signal supplied to a third scan line, and having an emission time controlled by a third emission control signal, and the third pixels receive the third data signal after a third time different from the first time and the second time after the third emission control signal is supplied.

According to an embodiment, the third time is set to be longer than the first time and the second time.

According to an embodiment, the first emission control signal, the second emission control signal, and the third emission control signal are sequentially supplied with a predetermined time difference. According to an embodiment, each of the first pixels and the second pixels includes a light emitting element positioned between a first power line to which first power is supplied and a second power line to which second power is supplied, a first transistor connected between the first power line and a first electrode of the light emitting element and controlling a current amount flowing from the first power to the second power via the light emitting element in response to a voltage of a gate electrode, a second transistor connected between the data line and the gate electrode of the first transistor and turned on when the first scan signal or the second scan signal is supplied, and a third transistor positioned in a current path between the first power line and the second power line, turned off when the first emission control signal or the second emission control signal is supplied, and turned on in other cases.

According to an embodiment, each of the first pixels includes a first light emitting element and a first driving transistor, and receives a voltage of first initialization power for initializing a gate electrode of the first driving transistor, a voltage of second initialization power for initializing a first electrode of the first light emitting element, and a voltage of first bias power for setting the first driving transistor to a bias state.

According to an embodiment, each of the second pixels includes a second light emitting element and a second driving transistor, and receives a voltage of third initialization power for initializing a gate electrode of the second driving transistor, a voltage of fourth initialization power for initializing a first electrode of the second light emitting element, and a voltage of second bias power for setting the second driving transistor to a bias state.

According to an embodiment, the voltage of the first initialization power is different from the voltage of the third initialization power, the voltage of the second initialization power is different from the voltage of the fourth initialization power, and the voltage of the first bias power is different from the voltage of the second bias power.

According to an embodiment, an absolute value of the voltage of the first initialization power is set to be lower than an absolute value of the voltage of the third initialization power, an absolute value of the voltage of the second initialization power is set to be higher than an absolute value of the voltage of the fourth initialization power, and an absolute value of the voltage of the first bias power is set to be higher than an absolute value of the voltage of the second bias power.

According to another embodiment of the disclosure, a display device includes first pixels positioned on one side of a panel and receiving a first data signal after a first time after a first emission control signal is supplied, and second pixels disposed on another side of the panel and receiving a second data signal after a second time, which is different from the first time, after a second emission control signal is supplied.

According to an embodiment of the disclosure, a method of driving a display device includes supplying a first scan signal after a first time after a first emission control signal for turning off emission is supplied to each of first pixels positioned on one side of a panel, and supplying a second scan signal after a second time, which is different from the first time, after a second emission control signal for turning off emission is supplied to each of second pixels positioned on another side of the panel.

According to an embodiment, the second time is set to be longer than the first time.

According to an embodiment, first emission control signals supplied to the one side of the panel and second emission control signals supplied to the other side of the panel are sequentially supplied with a predetermined time difference.

According to an embodiment, a predetermined period after the first scan signal is supplied to the first pixels and before the second scan signal is supplied to the second pixels is an IFP touch sensing period.

In accordance with the display device and the method of driving the same according to embodiments of the disclosure, since a touch sensing period (inter frame pause (IFP) period) is included in a frame period, accuracy of a touch may be improved.

In addition, in accordance with the display device and the method of driving the same according to embodiments of the disclosure, the emission control signal may be sequentially supplied regardless of a position of a panel, thereby preventing display quality deterioration due to the IFP period.

However, an effect of the disclosure is not limited to the above-described effect, and may be variously expanded without departing from the spirit and scope of the disclosure.

BRIEF DESCRIPTION OF THE DRAWINGS

The above and other features of the disclosure will become more apparent by describing in further detail embodiments thereof with reference to the accompanying drawings, in which.

DETAILED DESCRIPTION OF THE EMBODIMENT

Figure 1:
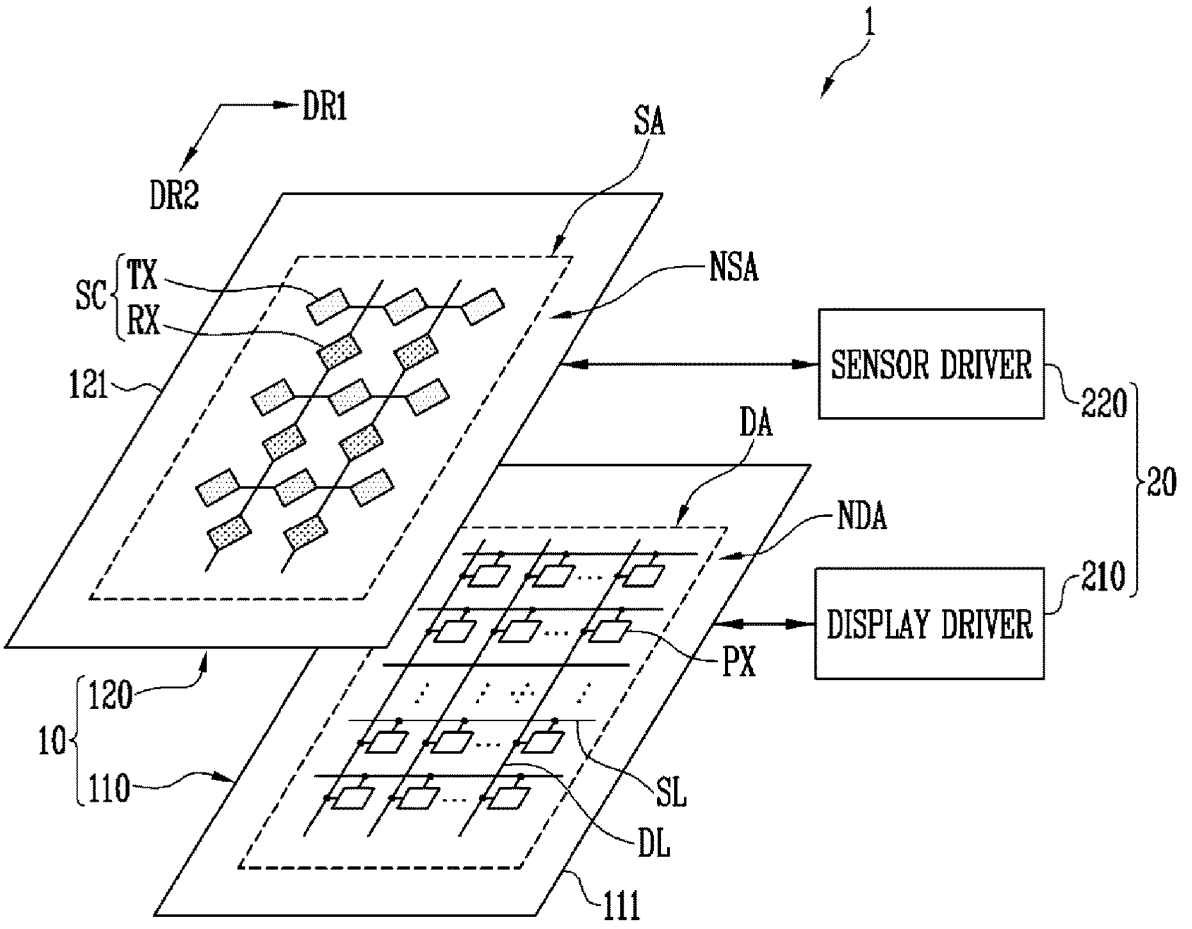
FIG. 1 is a diagram illustrating a display device according to an embodiment of the disclosure.

Hereinafter, various embodiments of the disclosure will be described in detail with reference to the accompanying drawings so that those skilled in the art may easily carry out the disclosure. The disclosure may be implemented in various different forms and is not limited to the embodiments described herein.

In order to clearly describe the disclosure, parts that are not related to the description are omitted, and the same or similar elements are denoted by the same reference numerals throughout the specification. Therefore, the above-described reference numerals may be used in other drawings.

In addition, sizes and thicknesses of each component shown in the drawings are arbitrarily shown for convenience of description, and thus the disclosure is not necessarily limited to those shown in the drawings. In the drawings, thicknesses may be exaggerated to clearly express various layers and areas.

In addition, an expression "is the same" in the description may mean "is substantially the same". That is, the expression "is the same" may be the same enough for those of ordinary skill to understand that it is the same. Other expressions may also be expressions in which "substantially" is omitted.

FIG. 1 is a diagram illustrating a display device according to an embodiment of the disclosure.

Referring to FIG. 1, the display device 1 according to an embodiment of the disclosure includes a panel 10 and a driving circuit unit 20 for driving the panel 10.

The panel 10 may include a display unit 110 for displaying an image and a sensor unit 120 for sensing touch, pressure, fingerprint, hovering, and the like. For example, the panel 10 may include pixels PX and sensors SC positioned to overlap at least a portion of the pixels PX. In an embodiment, the sensors SC may include first sensors TX and second sensors RX. In another embodiment (for example, in a self-capacitance method), the sensors SC may be configured as one type of sensors without distinction between the first sensor and the second sensor.

The driving circuit unit 20 may include a display driver 210 for driving the display unit 110 and a sensor driver 220 for driving the sensor unit 120. The pixels PX may display an image in a frame period unit. The sensors SC may sense an input (that is, a touch input) of a user between a frame and a frame, or during a frame period.

According to an embodiment, the display unit 110 and the sensor unit 120 may be separately manufactured, and then disposed and/or combined so that at least one area overlaps each other. Alternatively, in another embodiment, the display unit 110 and the sensor unit 120 may be integrally manufactured. For example, the sensor unit 120 may be directly formed on at least one substrate configuring the display unit 110 (for example, an upper substrate and/or a lower substrate of the display panel, or a thin film encapsulation layer), or other insulating layers or various functional layer (for example, an optical layer or a protective layer).

Meanwhile, as depicted in FIG. 1, the sensor unit 120 is disposed on a front surface (for example, an upper surface on which an image is displayed) of the display unit 110, but a position of the sensor unit 120 is not limited thereto. For example, the sensor unit 120 may be disposed on a back surface or both surfaces of the display unit 110. In still another embodiment, the sensor unit 120 may be disposed on at least one side edge area of the display unit 110.

The display unit 110 may include a display substrate 111 and a plurality of pixels PX formed on the display substrate 111. The pixels PX may be disposed in a display area DA of the display substrate 111.

The display substrate 111 may include a display area DA where the pixels PX are disposed to display an image and a non-display area NDA outside the display area DA. According to an embodiment, the display area DA may be disposed in a center of the display unit 110, and the non-display area NDA may be disposed in an edge area of the display unit 110 to surround the display area DA.

The display substrate 111 may be a rigid substrate or a flexible substrate, and a material or a physical property thereof is not particularly limited. For example, the display substrate 111 may be a rigid substrate configured of glass or tempered glass, or a flexible substrate configured of a thin film of a plastic or metal material.

In the display area DA, the pixels PX are disposed to be connected to scan lines SL and data lines DL. The pixels PX are selected by a scan signal of a turn-on level supplied to the scan lines SL, receive a data signal from the data lines DL, and emit light of a luminance corresponding to the data signal. Accordingly, an image corresponding to the data signal is displayed in the display area DA.

In the non-display area NDA, various lines and/or a built-in circuit unit connected to the pixels PXL of the display area DA may be disposed. For example, a plurality of lines for supplying various power and control signals to the display area DA may be disposed in the non-display area NDA, and a scan driver or the like may be further disposed in the non-display area NDA.

In the disclosure, a type of the display unit 110 is not particularly limited. For example, the display unit 110 may be implemented as a self-emission type display panel such as an organic light emitting display panel. However, when the display unit 110 is implemented as a self-emission type, each pixel PX is not limited to a case where only the organic light emitting element is included. For example, a light emitting element of each pixel PX may be configured of an organic light emitting diode, an inorganic light emitting diode, a quantum dot/well light emitting diode, or the like. A plurality of light emitting elements may be provided in each pixel PX. At this time, the plurality of light emitting elements may be connected in series, parallel, series-parallel, or the like.

The sensor unit 120 may include a sensor substrate 121 and a plurality of sensors SC formed on the sensor substrate 121. The sensors SC may be disposed in a sensing area SA on the sensor substrate 121.

The sensor substrate 121 may include the sensing area SA in which a touch input or the like may be sensed, and a peripheral area NSA outside the sensing area SA. According to an embodiment, the sensing area SA may be disposed to overlap at least one area of the display area DA. For example, the sensing area SA may be set to an area corresponding to the display area DA (for example, an area overlapping the display area DA), and the peripheral area NSA may be set to an area corresponding to the non-display area NDA (for example, an area overlapping the non-display area NDA). In this case, when the touch input is provided on the display area DA, the touch input may be detected through the sensor unit 120.

The sensor substrate 121 may be a rigid or flexible substrate, and may be configured of at least one layer of insulating layer, but is not limited thereto. That is, in the disclosure, a material and a physical property of the sensor substrate 121 are not particularly limited.

The sensing area SA is set as an area capable of responding to the touch input (that is, an active area of a sensor). To this end, the sensors SC for sensing the touch input may be disposed in the sensing area SA. According to an embodiment, the sensors SC may include first sensors TX and second sensors RX.

The first sensors TX and the second sensors RX may be arranged in different directions. For example, the first sensors TX may be arranged to extend in a first direction DR1, and the second sensors RX may be arranged to extend in a second direction.

In an embodiment, an extension direction and an arrangement direction of the first sensors TX may follow various currently known configurations. Each of the first sensors TX may have a form in which first cells of a relatively large area and first bridges of a relatively narrow area are connected. In FIG. 1, each of the first cells is shown in a diamond shape, but each of the first cells may be configured in various conventional shapes such as a circle, a quadrangle, a triangle, and a mesh form. For example, the first bridges may be integrally formed on the same layer as the first cells. In another embodiment, the first bridges may be formed on a layer different from that of the first cells and may electrically connect adjacent first cells.

In an embodiment, an extension direction and an arrangement direction of the second sensors RX may follow various currently known configurations. Each of the second sensors RX may have a form in which second cells of a relatively large area and second bridges of a relatively narrow area are connected. In FIG. 1, each of the second cells is shown in a diamond shape, but may be configured in various conventional shapes such as a circle, a quadrangle, a triangle, and a mesh form. For example, the second bridges may be integrally formed on the same layer as the second cells. In another embodiment, the second bridges may be formed on a layer different from that of the second cells and may electrically connect adjacent second cells.

According to an embodiment, each of the first sensors TX and the second sensors RX may have conductivity by including at least one of a metal material, a transparent conductive material, and various other conductive materials. In addition, each of the first sensors TX and the second sensors RX may be formed as a single layer or multiple layers, and a cross-sectional structure thereof is not limited.

Meanwhile, sensor lines for electrically connecting the sensors SC to the sensor driver 220 and the like may be disposed in the peripheral area NSA of the sensor unit 120.

The driving circuit unit 20 may include the display driver 210 for driving the display unit 110 and the sensor driver 220 for driving the sensor unit 120. In an embodiment, the display driver 210 and the sensor driver 220 may be configured of integrated chips (ICs) separated from each other. In another embodiment, at least a partial configuration of the display driver 210 and the sensor driver 220 may be integrated into one IC together.

The display driver 210 is electrically connected to the display unit 110 to drive the pixels PX. For example, the display driver 210 may include the data driver and a timing controller, and the scan driver may be separately mounted in the non-display area NDA of the display unit 110. In another embodiment, the display driver 210 may include all or at least a portion of the data driver, the timing controller, and the scan driver. In another embodiment, the display driver 210 may correspond to at least one of a graphics processing unit (GPU), a central processing unit (CPU), and an application processor (AP). In another embodiment, the display driver 210 may be a set of at least one of the GPU, the CPU, and the AP, and the timing controller.

The sensor driver 220 is electrically connected to the sensor unit 120 to drive the sensor unit 120. The sensor driver 220 may include a sensor transmitter and a sensor receiver. According to an embodiment, the sensor transmitter and the sensor receiver may be integrated into one IC, but are not limited thereto.

In an embodiment, the sensor driver 220 may detect a user's input by driving the sensors SC during a touch sensing period.

Figure 2A:
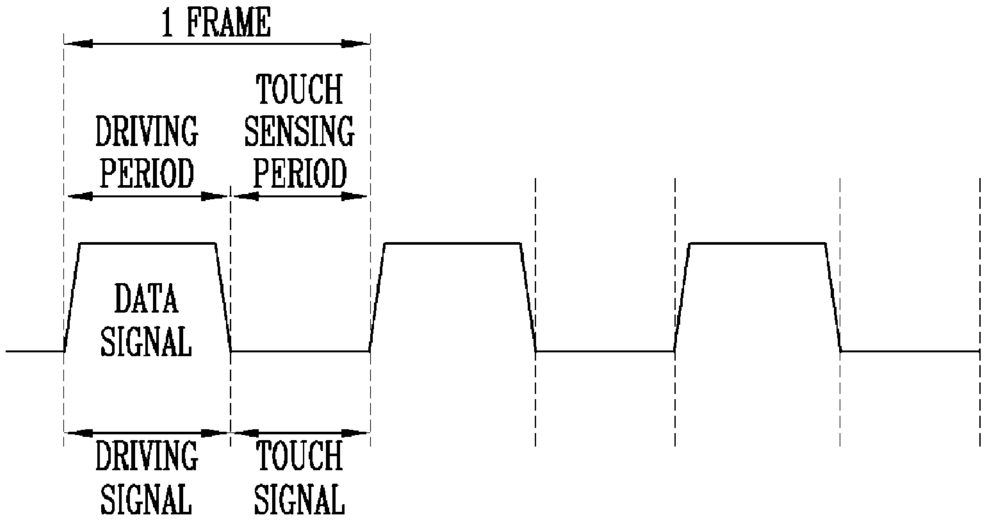
FIGS. 2A and 2B are diagrams illustrating an embodiment of a touch sensing period included in one frame period.
Figure 2B:
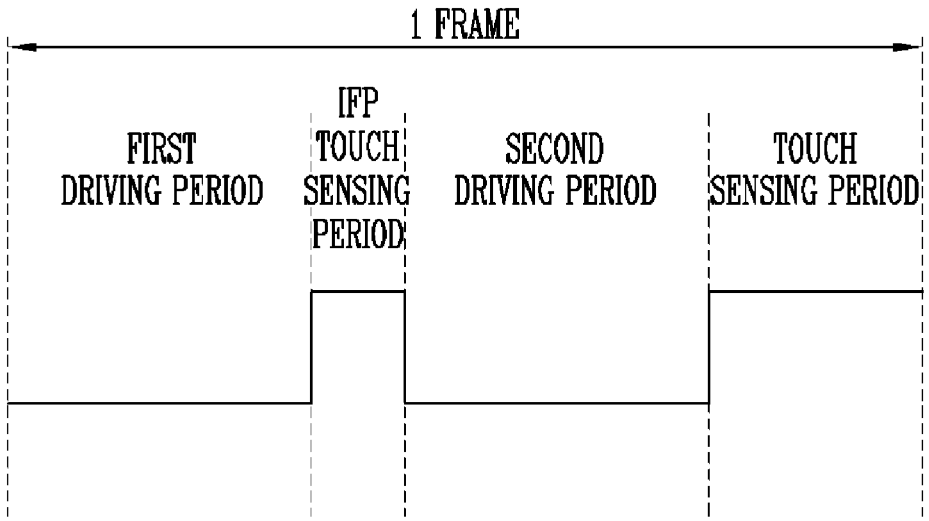

FIGS. 2A and 2B are diagrams illustrating an embodiment of the touch sensing period included in one frame period.

Referring to FIG. 2A, one frame period may be divided into a driving period in which a driving signal (for example, the data signal and the scan signal) is supplied and the touch sensing period in which a touch signal is supplied.

In the driving period, the pixels PX are sequentially selected by the scan signal supplied from the display driver 210 to the scan lines SL, and the data signal supplied to the data lines DL is supplied to the pixels PX. Thereafter, the pixels PX receiving the data signal emit the light of the luminance corresponding to the data signal.

In the touch sensing period, the touch signal is supplied from the sensor driver 220 to the sensors SC, and thus the touch input is sensed. The touch input sensed by the sensors SC may be supplied to the sensor driver 220 as a predetermined sensing signal, and the sensor driver 220 may sense touch input from a user using the sensing signal.

In an embodiment, as shown in FIG. 2A, a driving period and a touch sensing period comprise one frame (1 Frame), and the driving period and the touch sensing period do not overlap each other within one frame period so as to improve touch accuracy and so as not to include noise in the data signal. For example, the touch sensing period may be positioned to overlap a blank period of one frame.

Furthermore, as depicted to FIG. 2B, one frame may be divided into a first driving period, an inter frame pause (IFP) touch sensing period, a second driving period, and a touch sensing period to be driven. That is, touch sensing may be sensed at least twice during one frame period as shown in FIG. 2B so that the touch input may be more accurately sensed. In this case, the driving period may be divided into a first driving period and a second driving period, and the touch sensing period may be positioned between the first driving period and the second driving period. Here, the touch sensing period positioned between the first driving period and the second driving period may be IFP touch sensing period. In FIG. 2B, sensing of the touch input may be performed at least once between the first driving period and the second driving period, and at least once during the blank period before a new frame is started.

In the first driving period, pixels PX positioned in a first area are sequentially selected by the scan signal supplied from the display driver 210 to the scan lines SL positioned in the first area of the display unit 110, and the data signal supplied to the data lines DL is supplied to the pixels PX positioned in the first area.

In the second driving period, pixels PX positioned in a second area are sequentially selected by the scan signal supplied from the display driver 210 to the scan lines SL positioned in the second area of the display unit 110, and the data signal supplied to the data lines DL is supplied to the pixels PX positioned in the second area.

In the IFP touch sensing period, the touch signal is supplied from the sensor driver 220 to the sensors SC, and thus the touch input is sensed. The touch input sensed by the sensors SC may be supplied to the sensor driver 220 as a predetermined sensing signal, and the sensor driver 220 may sense the user's touch input using the sensing signal.

Meanwhile, the data signal is not supplied to the data lines DL in the IFP touch sensing period. For example, the data signal is not supplied to the data lines DL in the IFP touch sensing period so as to improve accuracy of touch and/or so as not to include noise due to the data signal.

In the touch sensing period after the second driving period, the touch signal is supplied from the sensor driver 220 to the sensors SC, and thus the touch input is sensed. Here, the touch sensing period may overlap the blank period of the frame.

Meanwhile, FIG. 2B shows that the IFP touch sensing period is inserted in a middle of the frame, but the disclosure is not limited thereto. For example, the IFP touch sensing period may be inserted in a beginning of the frame, the middle of the frame, and/or a latter half of the frame. In addition, the number of IFP touch sensing periods inserted in one frame may be variously set to at least once or more.

Figure 3:
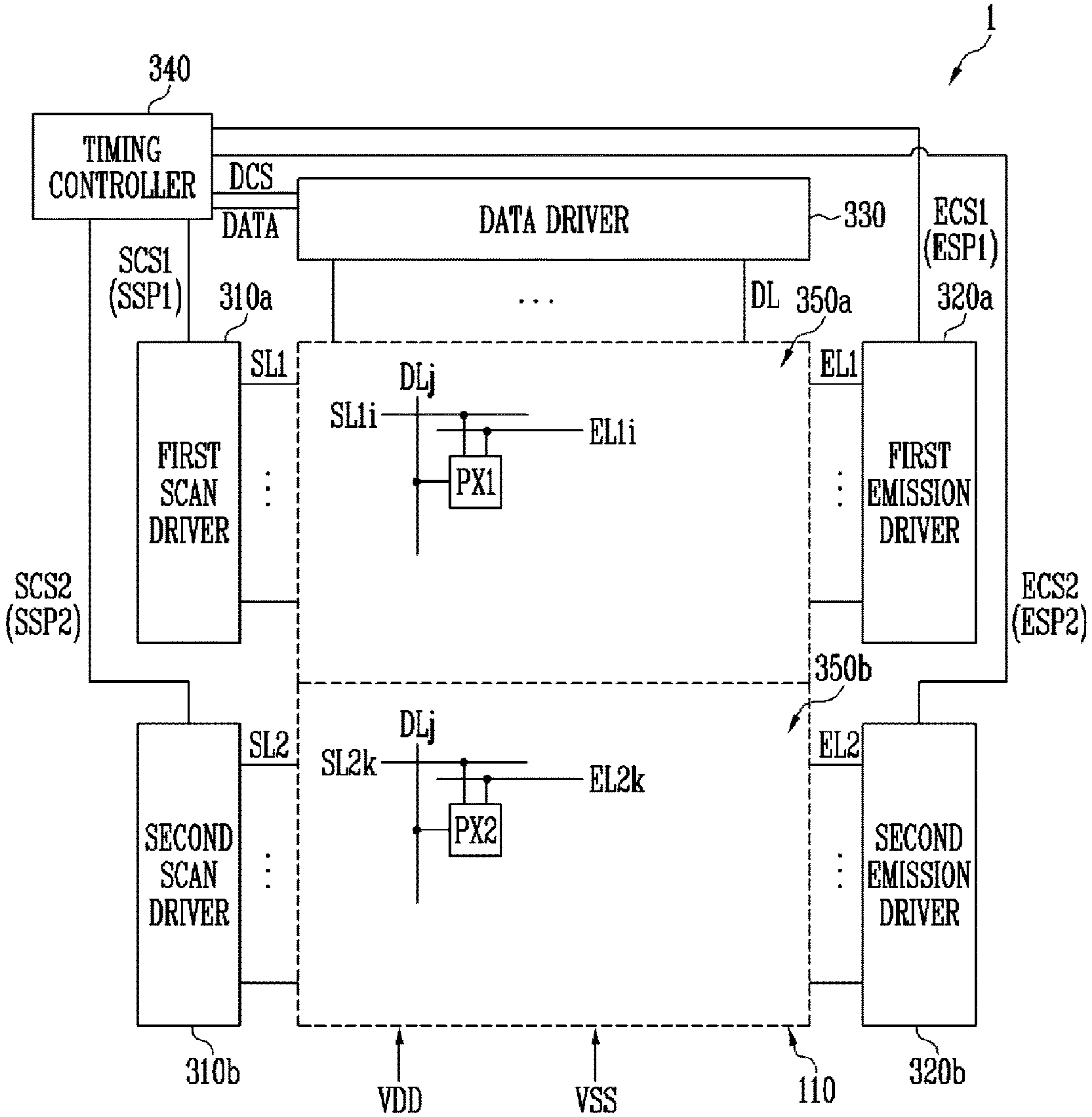
FIG. 3 is a diagram illustrating a configuration of a display unit according to an embodiment of the disclosure.

FIG. 3 is a diagram illustrating a configuration of a display unit according to an embodiment of the disclosure.

Referring to FIG. 3, the display device 1 according to an embodiment of the disclosure includes a display unit 110, drivers 310*a*, 310*b*, 320*a*, 320*b*, 330, and a timing controller 340.

The display unit 110 includes first pixels PX1 positioned in a first area 350*a* that is one side of a panel and second pixels PX2 positioned in a second area 350*b* that is another side of the panel. Here, sizes (or areas) of the first area 350*a* and the second area 350*b* may be variously set according to a position of the IFP touch sensing period within the frame. For example, when the IFP touch sensing period is inserted in the middle of the frame, the first area 350*a* and the second area 350*b* may be set to have the same area (for example, include the same number of scan lines SL1 and SL2). In another embodiment, when the IFP touch sensing period is inserted in the beginning of the frame, the first area 350_a_ may be set to an area less than that of the second area 350_b_.

Each of the first pixels PX1 is respectively connected to first scan lines SL1, first emission control lines EL1, and the data lines DL, which are disposed in the first area 350_a_. In an embodiment, a first pixel PX1 arranged in an i-th (i is a natural number) row and a j-th (j is a natural number) column may be connected to a first scan line SL1_i_ corresponding to the i-th row, a first emission control line EL1_i_ corresponding to the i-th row, and a data line DLj corresponding to the j-th column.

Similarly, each of the second pixels PX2 is respectively connected to second scan lines SL2, a second emission scan line EL2, and the data lines DL, which are disposed in the second area 350_b_. In an embodiment, a second pixel PX2 arranged in a k-th (k is a natural number greater than i) row and the j-th column may be connected to a second scan line SL2_k_ corresponding to the k-th row, a second emission control line EL2_k_ corresponding to the k-th row, and the data line DLj corresponding to the j-th column.

In an embodiment, the first pixels PX1 and the second pixels PX2 may include the same circuit structure. For example, each of the first pixels PX1 and the second pixels PX2 may include a light emitting element, a switching transistor connected to the scan lines SL1 and SL2, an emission control transistor connected to the emission control lines EL1 and EL2, and a driving transistor for controlling a driving current supplied to the light emitting element. In other words, the first pixels PX1 and the second pixels PX2 may include the light emitting element, the switching transistor, the emission control transistor, and the driving transistor, and may further include various transistors and capacitors.

Each of the first pixels PX1 and the second pixels PX2 may receive first power VDD and second power VSS from an outside. The first power VDD and the second power VSS may be used to drive the light emitting element. To this end, the first power VDD may be set to a voltage higher than that of the second power VSS.

The first scan driver 310_a_ may supply a first scan signal to the first scan lines SL1 positioned in the first area 350_a_ in response to a first driving control signal SCS1 supplied from the timing controller 340. For example, the first scan driver 310_a_ may sequentially supply the first scan signal to the first scan lines SL1. When the first scan signal is sequentially supplied, the first pixels PX1 may be selected in a horizontal line unit (that is, a pixel row unit), and the data signal may be supplied to the selected first pixels PX1. Here, the first scan signal may be set to a gate-on voltage (for example, a low level) so that the switching transistor is turned on.

A first emission driver 320_a_ may supply a first emission control signal to first emission control lines EL1 positioned in the first area 350_a_ in response to a third driving control signal ECS1 supplied from the timing controller 340. For example, the first emission driver 320_a_ may sequentially supply the first emission control signal to the first emission control lines EL1. When the first emission control signal is supplied, the first pixels PX1 may not emit light in the horizontal line unit. Here, the first emission control signal may be set to a gate-off voltage (for example, a high level) so that the emission control transistor is turned off.

Figure 5A:
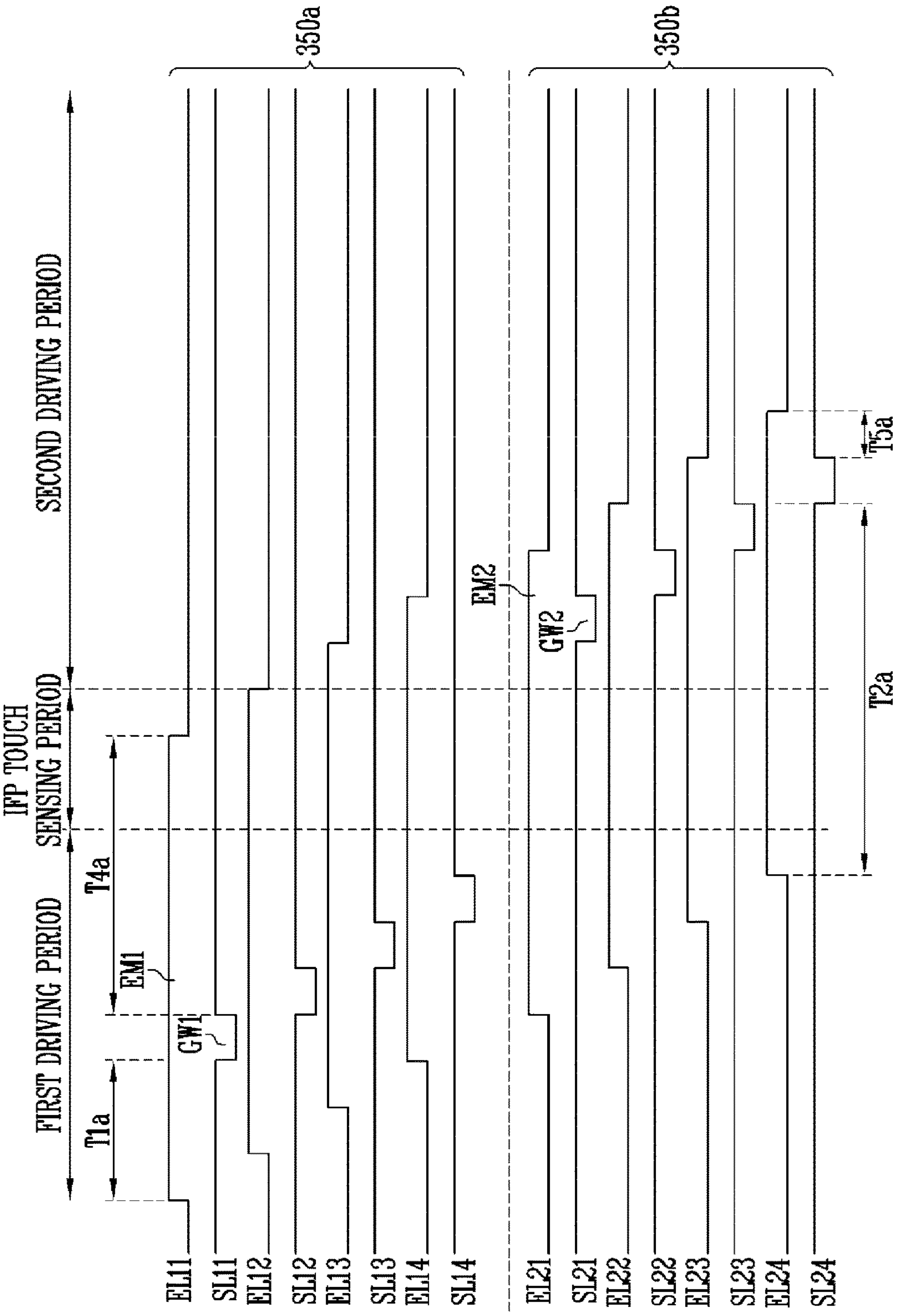
FIGS. 5A and 5B are waveform diagrams illustrating a supply time point of scan signals and emission control signals according to an embodiment of the disclosure.

Meanwhile, as shown in FIG. 5A, the first scan driver 310_a_ supplies a first scan signal GW1 to the first scan line SL1_i_ positioned in the i-th row after a first time T1_a_ after a first emission control signal EM1 is supplied to a first emission control line EL1_i_ positioned in the same pixel row, for example, the i-th row. This is described later in detail.

The second scan driver 310_b_ may supply a second scan signal GW2 to the second scan lines SL2 positioned in the second area 350_b_ in response to a second driving control signal SCS2 supplied from the timing controller 340. For example, the second scan driver 310_b_ may sequentially supply the second scan signal GW2 to the second scan lines SL2. When the second scan signal GW2 is sequentially supplied, the second pixels PX2 may be selected in the horizontal line unit, and the data signal may be supplied to the selected second pixels PX2. Here, the second scan signal GW2 may be set to a gate-on voltage (for example, a low level) so that the switching transistor is turned on.

The second emission driver 320_b_ may supply a second emission control signal EM2 to the second emission control lines EL2 positioned in the second area 350_b_ in response to a fourth driving control signal ECS2 supplied from the timing controller 340. For example, the second emission driver 320_b_ may sequentially supply the second emission control signal EM2 to the second emission control lines EL2. When the second emission control signal EM2 is supplied, the second pixels PX2 may not emit light the horizontal line unit. Here, the second emission control signal EM2 may be set to a gate-off voltage (for example, a high level) so that the emission control transistor is turned off.

Meanwhile, as shown in FIG. 5A, the second scan driver 320_a_ supplies a second scan signal GW2 to the second scan line SL2_k_ positioned in the k-th row after a second time T2_a_ after the second emission control signal EM2 is supplied to a second emission control line EL1_k_ positioned in the same pixel row, for example, the k-th row. This is described later in detail.

The data driver 330 receives a fifth driving control signal DCS and image data DATA from the timing controller 340. The data driver 330 generates the data signal by using the image data DATA in response to the fifth driving control signal DCS. The data signal generated by the data driver 330 may be supplied to the data lines DL to be synchronized with the first scan signal GW1 and the second scan signal GW2.

The timing controller 340 may generate the first driving control signal SCS1, the second driving control signal SCS2, the third driving control signal ECS1, the fourth driving control signal ECS2, and the fifth driving control signal DCS in response to synchronization signals supplied from the outside. In addition, the timing controller 340 generates the image data DATA by rearranging input data from the outside, and supplies the generated image data DATA to the data driver 330.

The first driving control signal SCS1 is supplied to the first scan driver 310_a_. A first scan start pulse SSP1 included in the first driving control signal SCS1 controls a first timing of the first scan signal GW1.

The second driving control signal SCS2 is supplied to the second scan driver 310_b_. A second scan start pulse SSP2 included in the second driving control signal SCS2 may control a first timing of the second scan signal GW2. For example, the timing controller 340 may control a supply time point of the first scan signal GW1 and the second scan signal GW2 using a supply timing of the first scan start pulse SSP1 and the second scan start pulse SSP2.

The third driving control signal ECS1 is supplied to the first emission driver 320_a_. A first emission start pulse ESP1 included in the third driving control signal ECS1 controls a first timing of the first emission control signal EM1.

The fourth driving control signal ECS2 is supplied to the second emission driver 320_b_. A second emission start pulse ESP2 included in the fourth driving control signal ECS2 controls a first timing of the second emission control signal EM2. For example, the timing controller 340 may control a supply time point of the first emission control signal EM1 and the second emission control signal EM2 using a supply timing of the first emission start pulse ESP1 and the second emission start pulse ESP2. In an embodiment, as shown in FIG. 5A, the first emission control signals EM1 and the second emission control signals EM2 may be sequentially supplied with a predetermined time difference.

Meanwhile, the scan drivers 310*a* and 310*b*, the emission drivers 320*a* and 320*b*, the data driver 330, and the timing controller 340 may be included in the display driver 210 of FIG. 1.

Figure 4A:
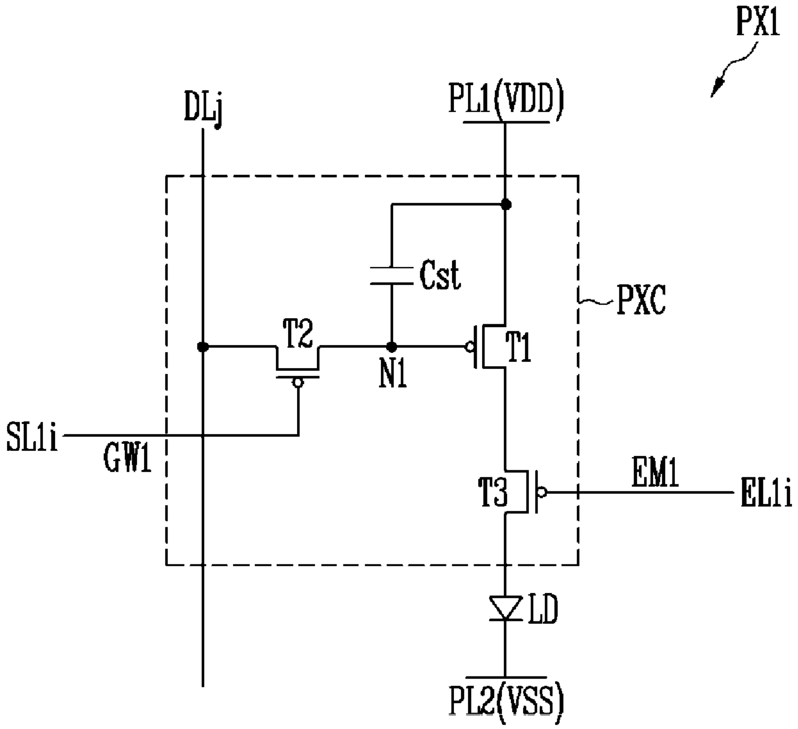
FIGS. 4A and 4B are diagrams illustrating an embodiment of a first pixel shown in FIG. 3.
Figure 4B:
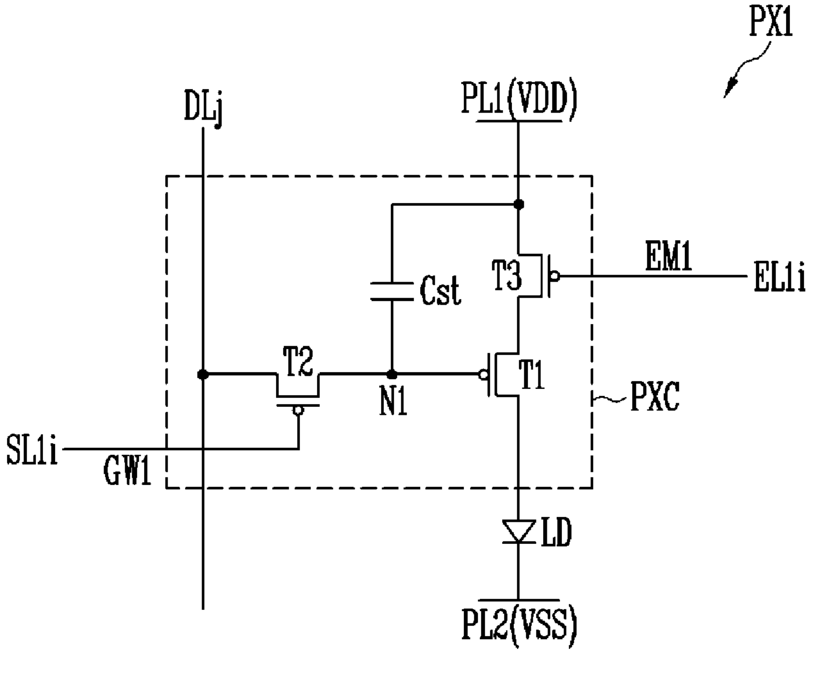

FIGS. 4A and 4B are diagrams illustrating an embodiment of the first pixel shown in FIG. 3. FIGS. 4A and 4B show the first pixel PX1 disposed in the i-th row (pixel row, or horizontal line) and the j-th column (pixel column, or vertical line). The second pixel PX2 has substantially the same pixel structure as the first pixel PX1 except that only the scan line and the emission control line connected to the first pixel PX1 are changed. Therefore, an additional description regarding the second pixel PX2 is omitted.

Referring to FIG. 4A, the first pixel PX1 according to an embodiment of the disclosure includes a light emitting element LD and a pixel circuit PXC for controlling a current amount supplied to the light emitting element LD.

The light emitting element LD may be connected between a first power line PL1 to which the first power VDD is supplied and a second power line PL2 to which the second power VSS is supplied. For example, the first electrode (for example, an anode electrode) of the light emitting element LD is connected to the first power line PL1 via a third transistor T3 and a first transistor T1, and a second electrode (for example, a cathode electrode) of the light emitting element LD is connected to the second power line PL2. The light emitting element LD may emit light with a luminance corresponding to the current amount supplied from the first transistor T1.

The light emitting element LD may be selected as an organic light emitting diode. In addition, the light emitting element LD may be selected as an inorganic light emitting diode such as a micro light emitting diode (LED) or a quantum dot light emitting diode. In addition, the light emitting element LD may be an element in which an organic material and an inorganic material are configured in combination. In FIG. 4A, the first pixel PX1 includes a single light emitting element LD, but in another embodiment, the first pixel PX1 may include a plurality of light emitting elements LD, and the plurality of light emitting elements LD may be connected to each other in series, parallel, or series-parallel.

The pixel circuit PXC includes the first transistor T1 (or a driving transistor), a second transistor T2 (or a switching transistor), the third transistor T3 (or an emission control transistor), and a storage capacitor Cst.

A first electrode of the first transistor T1 is connected to the first power line PL1, and a second electrode of the first transistor T1 is connected to a first electrode of the third transistor T3. In addition, a gate electrode of the first transistor T1 is connected to a first node N1. The first transistor T1 controls the current amount supplied to the light emitting element LD in response to a voltage of the first node N1. In an embodiment, the first electrode may be set as any one of a source electrode and a drain electrode, and the second electrode may be set as an electrode different from that of the first electrode. For example, when the first electrode is set as the source electrode, the second electrode may be set as the drain electrode.

A first electrode of the second transistor T2 is connected to the data line DLj, and a second electrode of the second transistor T2 is connected to the first node N1. In addition, a gate electrode of the second transistor T2 is connected to the first scan line SL1*i*. The second transistor T2 is turned on when the first scan signal GW1 is supplied to the first scan line SL1*i*. When the second transistor T2 is turned on, the data line DLj and the first node N1 are electrically connected, and thus the data signal from the data line DLj is supplied to the first node N1.

The first electrode of the third transistor T3 is connected to the second electrode of the first transistor T1, and a second electrode of the third transistor T3 is connected to the first electrode of the light emitting element LD. In addition, a gate electrode of the third transistor T3 is connected to the first emission control line EL1*i*. The third transistor T3 is turned off when the first emission control signal EM1 is supplied to the first emission control line EL1*i*, and is turned on when the first emission control signal EM1 is not supplied.

Meanwhile, in FIG. 4A, that the third transistor T3 is connected between the first transistor T1 and the light emitting element LD, but the disclosure is not limited thereto. For example, the third transistor T3 may be connected between the first power line PL1 and the first transistor T1 as shown in FIG. 4B.

The storage capacitor Cst is connected between the first node N1 and the first power line PL1. The storage capacitor Cst stores the voltage of the first node N1 (for example, a voltage of the data signal).

In an embodiment, transistors included in the first pixel PX1 are shown as P-type transistors, but the disclosure is not limited thereto. For example, the first pixel PX1 may include at least one N-type transistor. Here, the N-type transistor may be an oxide thin film transistor. For example, the oxide thin film transistor may be a low temperature polycrystalline oxide (LTPO) thin film transistor. However, this is an example, and the disclosure is not limited thereto. For example, an active pattern (semiconductor layer) included in the transistors may include an inorganic semiconductor (for example, amorphous silicon or poly silicon), an organic semiconductor, or the like.

An operation process is briefly described here. Firstly, the first emission control signal EM1 is supplied to the first emission control line EL1*i*, and thus the third transistor T3 is turned off. When the third transistor T3 is turned off, the first transistor T1 and the light emitting element LD are electrically cut off, and thus the first pixel PX1 is set to a non-emission state.

Thereafter, the first scan signal GW1 is supplied to the first scan line SL1*i*, and thus the second transistor T2 is turned on. When the second transistor T2 is turned on, the data line DLj and the first node N1 are connected, and thus the data signal is supplied to the first node N1. At this time, the storage capacitor Cst stores the voltage corresponding to the data signal.

Thereafter, supply of the first emission control signal EM1 to the first emission control line EL1*i* is stopped, and thus the third transistor T3 is turned on. When the third transistor T3 is turned on, the first transistor T1 and the light emitting element LD are electrically connected. At this time, the first transistor T1 supplies a predetermined current to the light emitting element LD in response to the voltage of the first node N1, and the light emitting element LD emits light with a luminance corresponding to the current amount supplied from the first transistor T1.

Figure 5B:
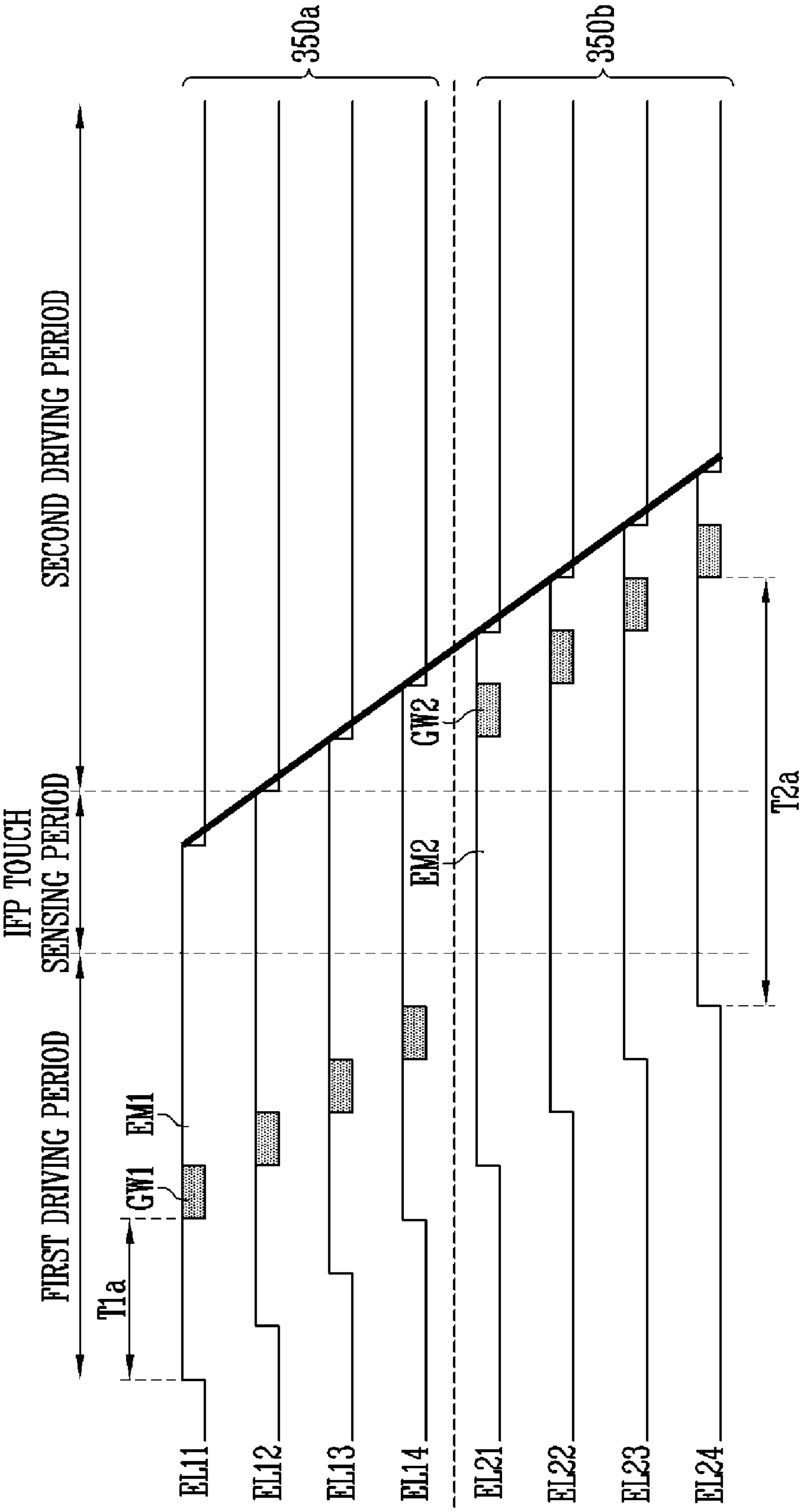

FIGS. 5A and 5B are waveform diagrams illustrating a supply time point of scan signals and emission control signals according to an embodiment of the disclosure. In FIGS. 5A and 5B, for convenience of description, it is assumed that four scan lines SL11, SL12, SL13, and SL14 and SL21, SL22, SL23, and SL24 and four emission control lines EL11, EL12, El13, and EL14 and EL21, EL22, EL23, and EL24 are included in each of the first area 350a and the second area 350b, respectively.

Referring to FIG. 5A, during a first driving period, the first scan driver 310a sequentially supplies the first scan signal GW1 to the first scan lines SL11, SL12, SL13, and SL14. The data driver 330 supplies the data signal (or a first data signal) to be synchronized with the first scan signal GW1 supplied to the first scan lines SL11, SL12, SL13, and SL14, and thus a voltage of the first data signal is stored in the first pixels PX1 connected to the first scan lines SL11, SL12, SL13, and SL14.

During the first driving period, the first emission driver 320a sequentially supplies the first emission control signal EM1 to the first emission control lines EL11, EL12, El13, and EL14 with a predetermined time difference. Then, the first pixels PX1 connected to the first emission control lines EL11, EL12, El13, and EL14 do not emit light sequentially in a row unit and store the voltage of the first data signal in response to the first scan signal GW1. The first pixels PX1 storing the voltage of the first data signal sequentially emit light in the row unit and generate light of a luminance corresponding to the first data signal.

During a second driving period, the second scan driver 310b sequentially supplies the second scan signal GW2 to the second scan lines SL21, SL22, SL23, and SL24. The data driver 330 supplies the data signal (or a second data signal) to be synchronized with the second scan signal GW2 supplied to the second scan lines SL21, SL22, SL23, and SL24, and thus a voltage of the second data signal is stored in the second pixels PX2 connected to the second scan lines SL21, SL22, SL23, and SL24.

During the second driving period, the second emission driver 320b sequentially supplies the second emission control signal EM2 to the second emission control lines EL21, EL22, EL23, and EL24 with a predetermined time difference. Then, the second pixels PX2 connected to the second emission control lines EL21, EL22, EL23, and EL24 do not emit light sequentially in the row unit and store the voltage of the second data signal in response to the second scan signal GW2. The second pixels PX2 storing the voltage of the second data signal sequentially emit light in the row unit and generate light of a luminance corresponding to the second data signal.

Meanwhile, in an embodiment of the disclosure, the IFP touch sensing period is positioned between the first driving period and the second driving period. In order to prevent a luminance decrease due to the IFP touch sensing period, in an embodiment of the disclosure, the first emission control signals EM1 and the second emission control signals EM2 are sequentially supplied with a predetermined time difference.

In other words, after the first emission control signal EM1 is supplied to the last first emission control line EL14 positioned in the first area 350a, the second emission control signal EM2 is supplied to the first second emission control line EL21 positioned in the second area 350b with the predetermined time difference. In this case, as shown in FIG. 5B, the first pixels PX1 and the second pixels PX2 may sequentially emit light with the predetermined time difference, and thus an occurrence of a luminance decrease at a boundary between the first area 350a and the second area 350b may be prevented.

Meanwhile, the first scan signal GW1 is supplied to each of the first scan lines SL11, SL12, SL13, and SL14 after a first time T1a after the first emission control signal EM1 is supplied to each of the first emission control lines EL11, EL12, EL13, and EL14 so that the IFP touch sensing period may be inserted after the first driving period. In other words, the first scan signal GW1 is supplied to the first first scan line SL11 after the first time T1a after the first emission control signal EM1 is supplied to the first first emission control line EL11. Then, the first scan signal GW1 is supplied to the last first scan line SL14 after the first time T1a after the first emission control signal EM1 is supplied to the last first emission control line EL14. That is, the first pixel PX1 positioned in a specific pixel row may receive the first scan signal after the first time T1a after the first emission control signal is supplied.

Similarly, the second scan signal GW2 is supplied to each of the second scan lines SL21, SL22, SL23, and SL24 after a second time T2a after the second emission control signal EM2 is supplied to each of the second emission control lines EL21, EL22, EL23, and EL24 so that the IFP touch sensing period may be inserted. In other words, the second scan signal GW2 is supplied to the first second scan line SL21 after the second time T2a after the second emission control signal EM2 is supplied to the first second emission control line EL21. Then, the second scan signal GW2 is supplied to the last second scan line SL24 after the second time T2a after the second emission control signal EM2 is supplied to the last second emission control line EL24. That is, the second pixel PX2 positioned in a specific pixel row may receive the second scan signal GW2 after the second time T2a after the second emission control signal EM2 is supplied.

In an embodiment, the first time T1a and the second time T2a are set differently. For example, the second time period T2a is set to be longer than the first time period T1a. Then, a predetermined time may be secured after the last first scan signal GW1 is supplied and before the first second scan signal GW2 is supplied, and this time may be used as the IFP touch sensing period.

Figure 6A:
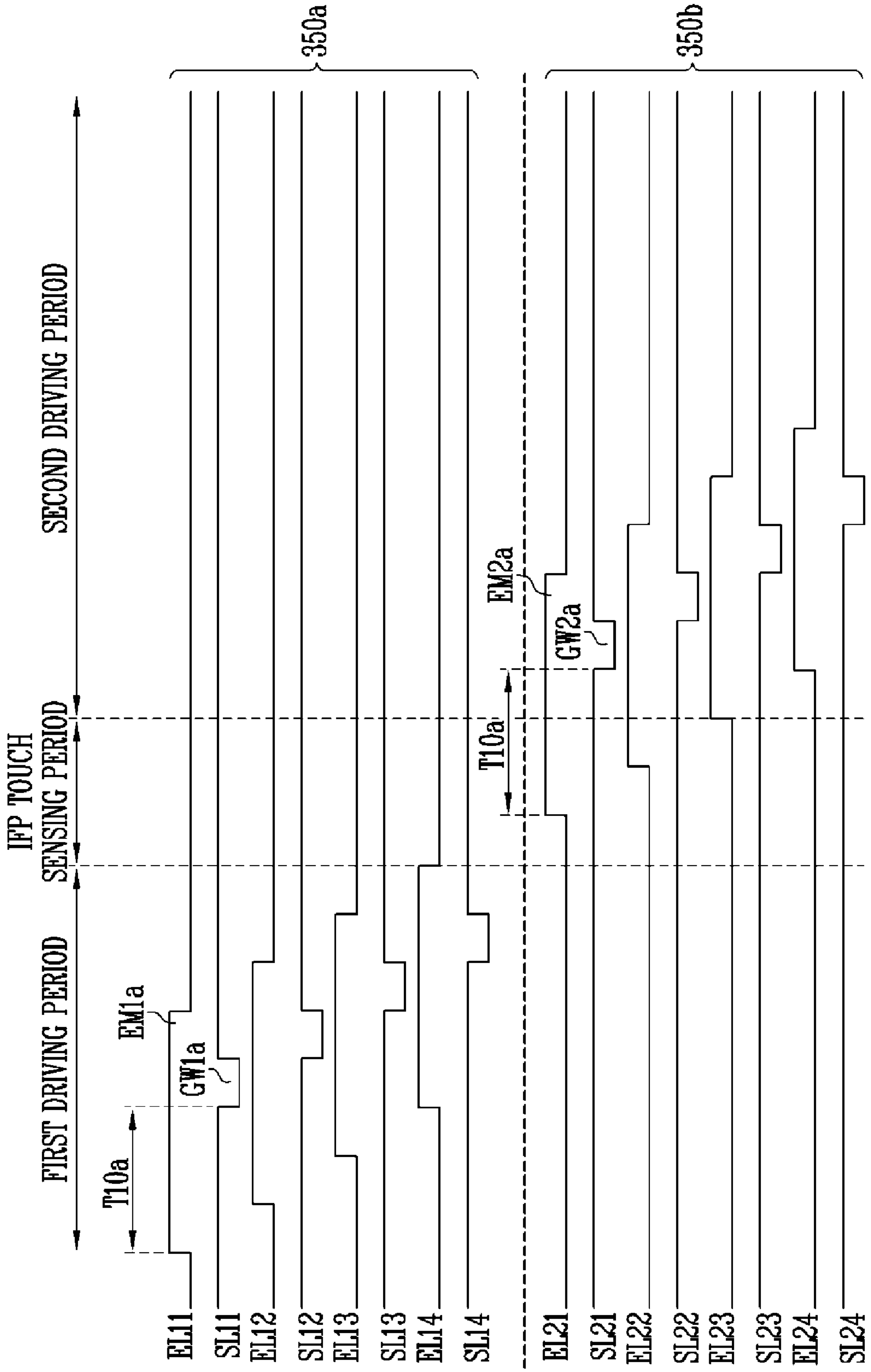
FIGS. 6A and 6B are waveform diagrams illustrating a supply time point of scan signals and emission control signals according to a comparative example.
Figure 6B:
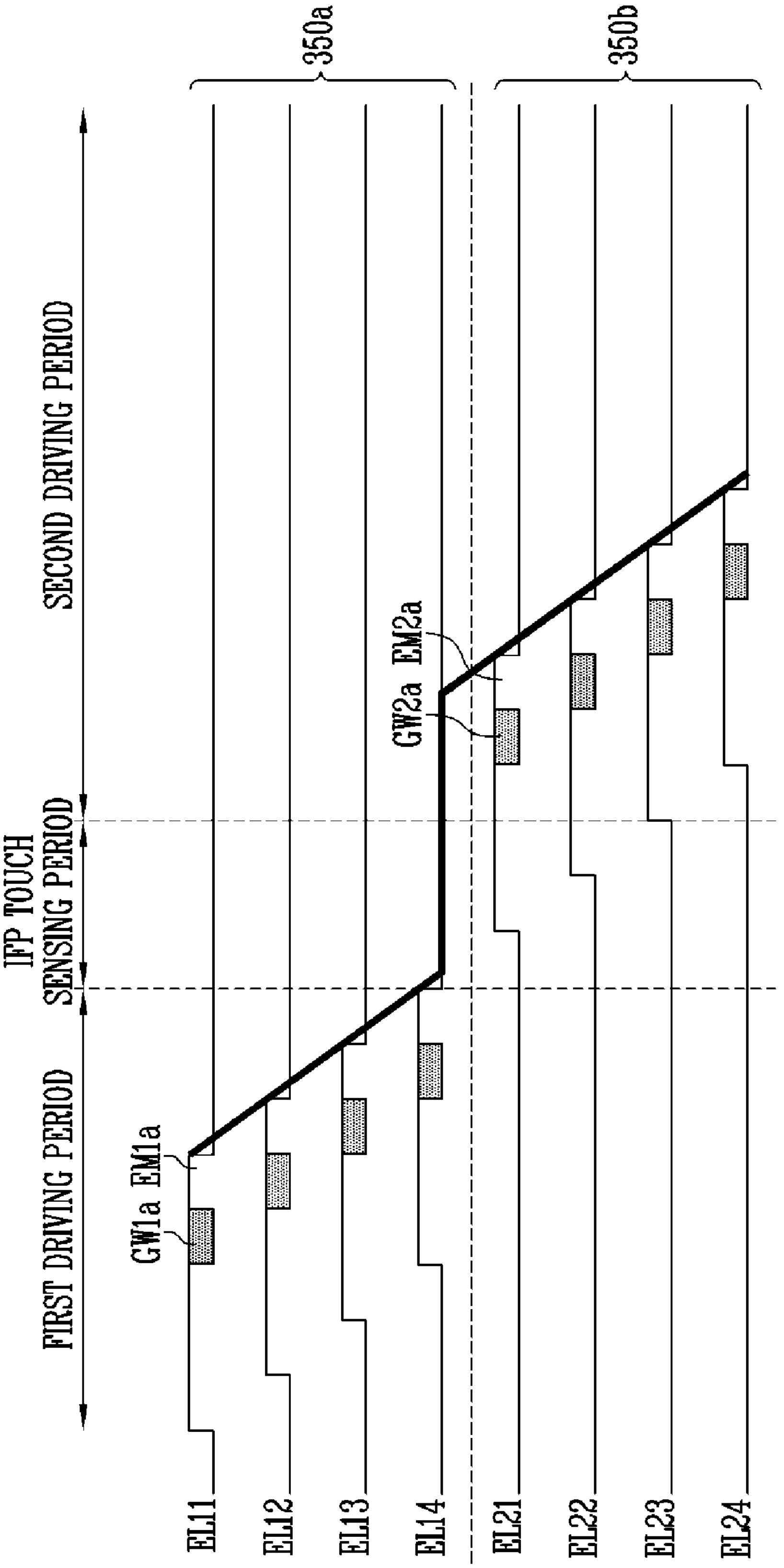
Figure 7:
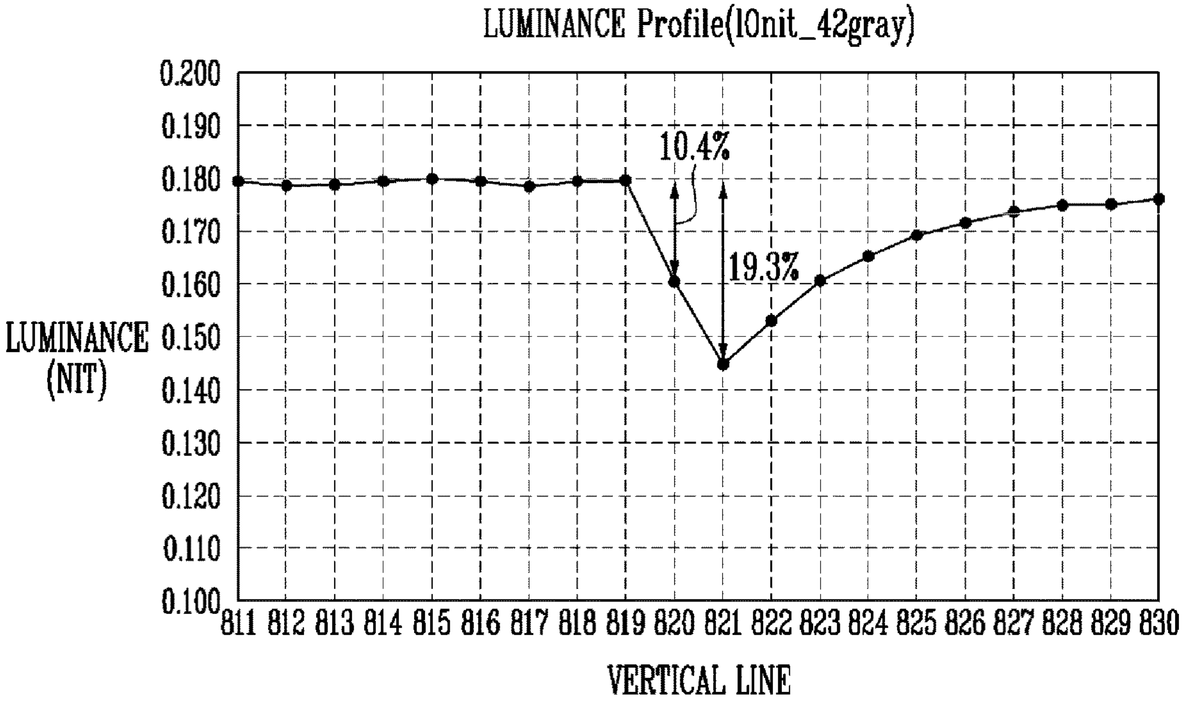
FIG. 7 (Prior Art)
FIG. 7 is a diagram illustrating a luminance of a boundary between a first area and a second area according to the comparative example.

FIGS. 6A and 6B are waveform diagrams illustrating a supply time point of scan signals and emission control signals according to a comparative example. FIG. 7 is a diagram illustrating a luminance of a boundary between a first area and a second area according to the comparative example. In FIGS. 6A and 6B, for convenience of description, it is assumed that four scan lines SL11, SL12, SL13, and SL14 and SL21, SL22, SL23, and SL24 and four emission control lines EL11, EL12, EL13, and EL14, and EL21, EL22, EL23, and EL24 are included in the first area 350a and the second area 350b, respectively.

Referring to FIG. 6A, during the first driving period, the first scan driver 310a sequentially supplies a first scan signal GW1a to the first scan lines SL11, SL12, SL13, and SL14, and the first emission driver 320a sequentially supplies a first emission control signal EM1a to the first emission control lines EL11, EL12, EL13, and EL14.

Then, during the second driving period, the second scan driver 310b sequentially supplies a second scan signal GW2a to the second scan lines SL11, SL12, SL13, and SL14, and the second emission driver 320b sequentially supplies a second emission control signal EM2a to the second emission control lines EL21, EL22, EL23, and EL24.

Here, the first scan driver 310*a* supplies the first scan signal GW1*a* to each of the first scan lines SL11, SL12, SL13, and SL14 after a tenth time T10*a* after the first emission control signal EM1*a* is supplied to each of the first emission control lines EL11, EL12, EL13, and EL14. In addition, the second scan driver 310*b* also supplies the second scan signal GW2*a* to each of the second scan lines SL21, SL22, SL23, and SL24 after the tenth time T10*a* after the second emission control signal EM2*a* is supplied to each of the second emission control lines EL21, EL22, EL23, and EL24.

In this case, the second emission control signal EM2*a* may be supplied to the first second emission control line EL21*a* after a predetermined time (that is, a time of the IFP touch sensing period) after the first emission control signal EM1*a* is supplied to the last first emission control line EL14 of the first area 350*a* so that the IFP touch sensing period may be inserted after the first driving period.

Then, as shown in FIG. 6B, emission of the pixel PX may be delayed during the predetermined time (for example, the time of the IFP touch sensing period) at the boundary between the first area 350*a* and the second area 350*b*. In other words, the first pixels PX1 sequentially emit light according to the first emission control signal EM1*a*. Then, after the predetermined time is delayed, the second pixels PX2 emit light sequentially according to the second emission control signal EM2*a*.

Meanwhile, as in the comparative example, when emission of the pixel PX is delayed in the first area 350*a* and the second area 350*b*, as shown in FIG. 7, a luminance may decrease at the boundary between the first area 350*a* and the second area 350*b*.

On the other hand, when the pixels PX sequentially emit light at the boundary between the first area 350*a* and the second area 350*b* without an emission delay as in an embodiment of the disclosure, a luminance decrease at the boundary may be prevented, and thus display quality may be improved.

Figure 8:
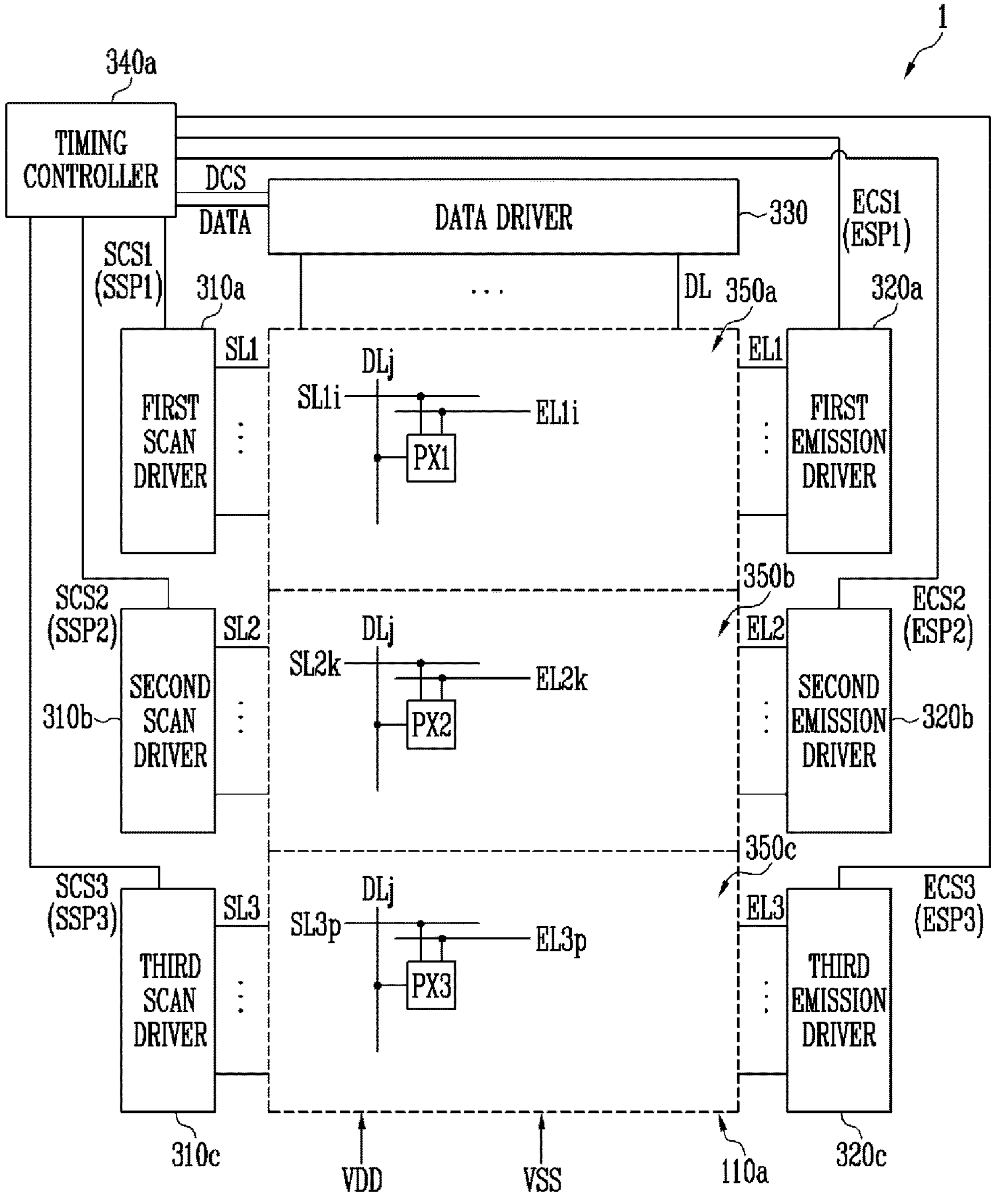
FIG. 8 is a diagram illustrating a configuration of a display unit according to another embodiment of the disclosure.

FIG. 8 is a diagram illustrating a configuration of a display unit according to another embodiment of the disclosure. In FIG. 8, the display unit 110 is divided into three areas 350*a*, 350*b*, and 350*c* so that two IFP touch sensing periods may be included in one frame, and a configuration thereof may be substantially similar or identical to that of FIG. 3. When describing FIG. 8, the same reference numerals are assigned to configurations similar to or identical to those of FIG. 3, and a detailed description thereof is omitted.

Referring to FIG. 8, the display device 1 according to another embodiment of the disclosure includes a display unit 110*a*, drivers 310*a*, 310*b*, 310*c*, 320*a*, 320*b*, 320*c*, and 330, and a timing controller 340*a*.

The display unit 110*a* includes first pixels PX1 positioned in a first area 350*a*, second pixels PX2 positioned in a second area 350*b*, and third pixels PX3 positioned in a third area 350*c*. Here, the first area 350*a* may be positioned on one side of the display unit 110*a*, the third area 350*c* may be positioned on another side of the display unit 110*a*, and the second area 350*b* may be positioned between the first area 350*a* and the third area 350*c*.

In an embodiment, sizes (or areas) of the first area 350*a*, the second area 350*b*, and the third area 350*c* may be variously set according to a position of the IFP touch sensing period within the frame.

The third pixels PX3 are respectively connected to third scan lines SL3, third emission control lines EL3, and the data lines DL disposed in the third area 350*c*. In an embodiment, a third pixel PX3 disposed in a p-th (p is a natural number greater than I and k) row and the j-th column may be connected to a third scan line SL3*p* corresponding to the p-th row and a third emission control line EL3*p* corresponding to the p-th row, and the data line DLj corresponding to the j-th column. The third pixels PX3 may include the same circuit structure as the first pixels PX1 and the second pixels PX2.

A third scan driver 310*c* may supply a third scan signal to the third scan lines SL3 positioned in the third area 350*c* in response to a sixth driving control signal SCS3 supplied from the timing controller 340*a*. For example, the third scan driver 310*c* may sequentially supply the third scan signal to the third scan lines SL3. When the third scan signal is sequentially supplied, the third pixels PX3 may be selected in the horizontal line unit, and the data signal may be supplied to the selected third pixels PX3. Here, the third scan signal may be set to a gate-on voltage (for example, a low level) so that the switching transistor (the second transistor T2 of FIG. 4A) may be turned on.

A third emission driver 320*c* may supply a third emission control signal to the third emission control lines EL3 positioned in the third area 350*c* in response to a seventh driving control signal ECS3 supplied from the timing controller 340*a*. When the third emission control signal is supplied, the third pixels PX3 may not emit light in the horizontal line unit. Here, the third emission control signal may be set to a gate-off voltage (for example, a high level) so that the emission control transistor (the third transistor T3 of FIG. 4A) may be turned off.

The timing controller 340*a* may generate the first driving control signal SCS1, the second driving control signal SCS2, the third driving control signal ECS1, the fourth driving control signal ECS2, the fifth driving control signal DCS, the sixth driving control signal SCS3, and the seventh driving control signal ECS3 in response to the synchronization signals supplied from the outside.

The sixth driving control signal SCS3 is supplied to the third scan driver 310*c*. A third scan start pulse SSP3 included in the sixth driving control signal SCS3 controls a first timing of the third scan signal.

The seventh driving control signal ECS3 is supplied to the third emission driver 320*c*. A third emission start pulse ESP3 included in the seventh driving control signal ECS3 controls a first timing of the third emission control signal.

Figure 9A:
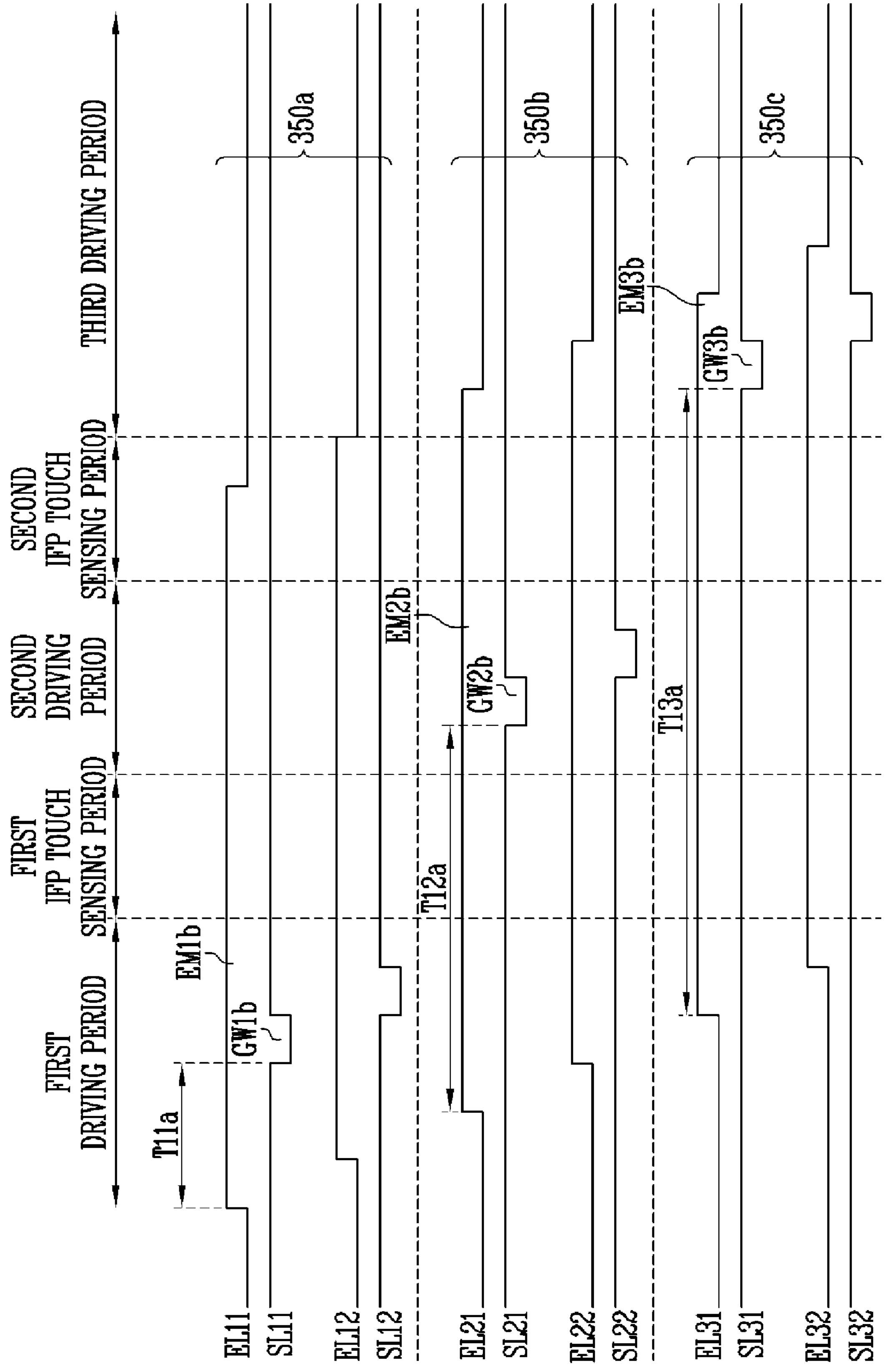
FIGS. 9A and 9B are waveform diagrams illustrating scan signals and emission control signals supplied to a display device of FIG. 8.
Figure 9B:
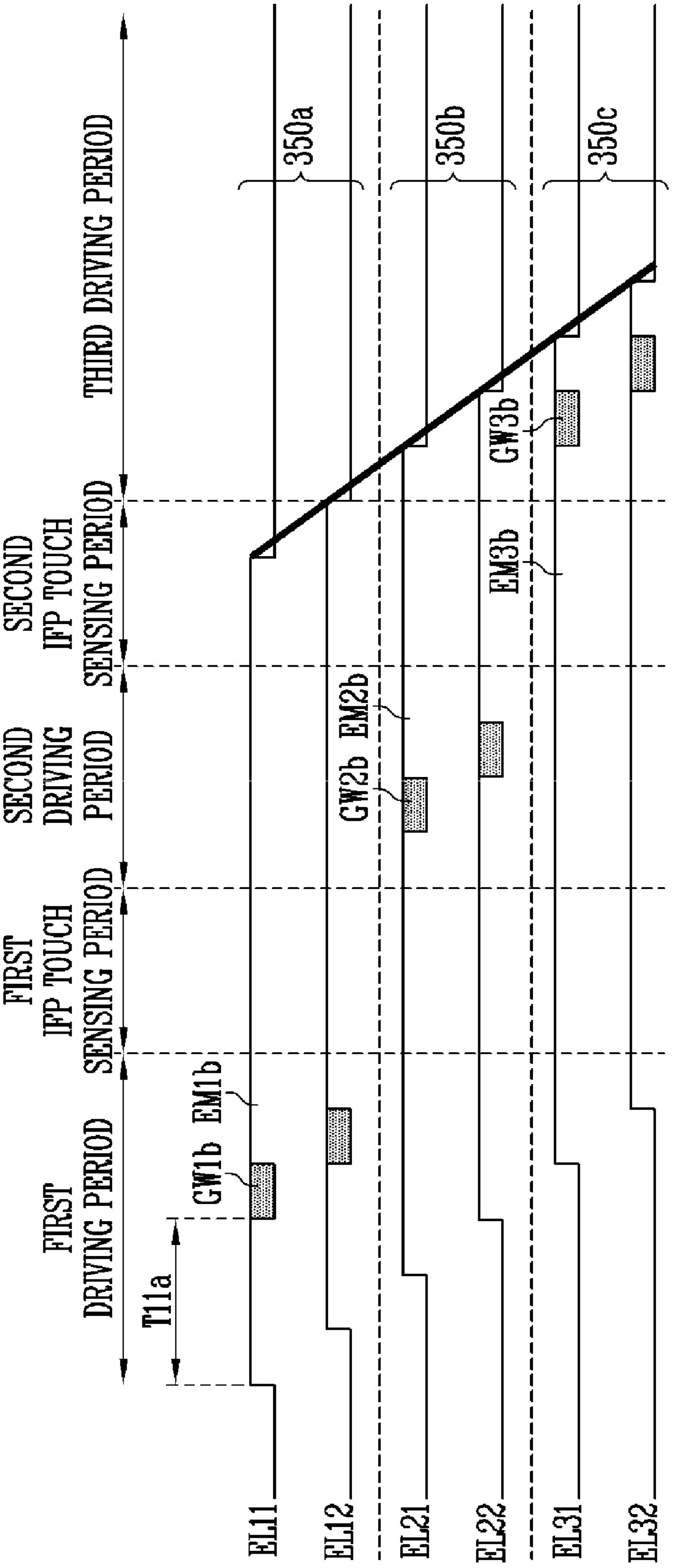

FIGS. 9A and 9B are waveform diagrams illustrating scan signals and emission control signals supplied to the display device of FIG. 8. In FIGS. 9A and 9B, for convenience of description, it is assumed that two scan lines SL11, SL12, SL21, SL22, SL31, and SL32 and two emission control lines EL11, EL12, EL21, EL22, EL31, and EL32 are included.

During a first driving period, the first scan driver 310*a* sequentially supplies a first scan signal GW1*b* to the first scan lines SL11 and SL12. The data driver 330 supplies the data signal (or the first data signal) to be synchronized with the first scan signal GW1*b* supplied to the first scan lines SL11 and SL12, and thus the voltage of the first data signal is stored in the first pixels PX1 connected to the first scan lines SL11 and SL12.

During the first driving period, the first emission driver 320*a* sequentially supplies a first emission control signal EM1*b* to the first emission control lines EL11 and EL12 with a predetermined time difference. Then, the first pixels PX1 connected to the first emission control lines EL11 and EL12 do not emit light sequentially in the row unit and store the voltage of the first data signal in response to the first scan signal GW1*b*. The first pixels PX1 storing the voltage of the first data signal sequentially emit light in the row unit and generate the light of the luminance corresponding to the first data signal.

During a second driving period, the second scan driver 310*b* sequentially supplies a second scan signal GW2*b* to the second scan lines SL21 and SL22. The data driver 330 supplies the data signal (or the second data signal) to be synchronized with the second scan signal GW2*b* supplied to the second scan lines SL21 and SL22, and thus the voltage of the second data signal is stored in the second pixels PX2 connected to the second scan lines SL21 and SL22.

During the second driving period, the second emission driver 320*b* sequentially supplies a second emission control signal EM2*b* to the second emission control lines EL21 and EL22 with a predetermined time difference. Then, the second pixels PX2 connected to the second emission control lines EL21 and EL22 do not emit light sequentially in the row unit and store the voltage of the second data signal in response to the second scan signal GW2*b*. The second pixels PX2 storing the voltage of the second data signal sequentially emit light in the row unit and generate the light of the luminance corresponding to the second data signal.

During a third driving period, a third scan driver 310*c* sequentially supplies a third scan signal GW3*b* to the third scan lines SL31 and SL32. The data driver 330 supplies a data signal (or a third data signal) to be synchronized with the third scan signal GW3*b* supplied to the third scan lines SL31 and SL32, and thus a voltage of the third data signal is stored in the third pixels PX3 connected to the third scan lines SL31 and SL32.

During the third driving period, a third emission driver 320*c* sequentially supplies a third emission control signal EM3*b* to the third emission control lines EL31 and EL32 with a predetermined time difference. Then, the third pixels PX3 connected to the third emission control lines EL31 and EL32 do not emit light sequentially in the row unit and store the voltage of the third data signal in response to the third scan signal GW3*b*. The third pixels PX3 storing the voltage of the third data signal sequentially emit light in the row unit and generate light of a luminance corresponding to the third data signal.

Meanwhile, in an embodiment of the disclosure, a first IFP touch sensing period is positioned between the first driving period and the second driving period, and a second IFP touch sensing period is positioned between the second driving period and the third driving period. In order to prevent a luminance decrease due to the first IFP touch sensing period and the second IFP touch sensing period, the first emission control signals EM1*b*, the second emission control signals EM2*b*, and the third emission control signals EM3*b* are sequentially supplied with a predetermined time difference in an embodiment of the disclosure.

In other words, after the first emission control signal EM1*b* is supplied to the last first emission control line EL12 positioned in the first area 350*a*, the second emission control signal EM2*b* is supplied to the first second emission control line EL21 positioned in the second area 350*b* with the predetermined time difference. In addition, after the second emission control signal EM2*b* is supplied to the last second emission control line EL22 positioned in the second area 350*b*, the third emission control signal EM3*b* is supplied to the first third emission control line EL31 positioned in the third area 350*c* with the predetermined time difference. In this case, as shown in FIG. 9B, the first pixels PX1, the second pixels PX2, and the third pixels PX3 may sequentially emit light with the predetermined time difference, and thus the luminance may be prevented from being decreased at a boundary between each of the areas 350*a*, 350*b*, and 350*c*.

Meanwhile, the first scan signal GW1*b* is supplied to each of the first scan lines SL11 and SL12 after an eleventh time T11*a* after the first emission control signal EM1*b* is supplied to the first emission control lines EL11 and EL12 so that the first IFP touch sensing period and the second IFP touch sensing period may be inserted. In other words, the first scan signal GW1*b* is supplied to the first first scan line SL11 after the eleventh time T11*a* after the first emission control signal EM1*b* is supplied to the first first emission control line EL11. That is, the first pixel PX1 positioned in a specific pixel row may receive the first scan signal GW1*b* after the eleventh time T11*a* after the first emission control signal EM1*b* is supplied.

In an embodiment, the second scan signal GW2*b* is supplied to each of the second scan lines SL21 and SL22 after a twelfth time T12*a* after the second emission control signal EM2*b* is supplied to the second emission control lines EL21 and EL22 so that the first IFP touch sensing period and the second IFP touch sensing period may be inserted. In other words, the second scan signal GW2*b* is supplied to the first second scan line SL21 after the twelfth time T12*a* after the second emission control signal EM2*b* is supplied to the first second emission control line EL21. That is, the second pixel PX2 positioned in a specific pixel row may receive the second scan signal GW2*b* after the twelfth time T12*a* after the second emission control signal EM2*b* is supplied.

In an embodiment, the third scan signal GW3*b* is supplied to each of the third scan lines SL31 and SL32 after a thirteenth time T13*a* after the third emission control signal EM3*b* is supplied to the third emission control lines EL31 and EL32 so that the first IFP touch sensing period and the second IFP touch sensing period may be inserted. In other words, the third scan signal GW3*b* is supplied to the first third scan line SL31 after the thirteenth time T13*a* after the third emission control signal EM3*b* is supplied to the first third emission control line EL31. That is, the third pixel PX3 positioned in a specific pixel row may receive the third scan signal GW3*b* after the thirteenth time T13*a* after the third emission control signal EM3*b* is supplied.

In an embodiment, the eleventh time T11*a*, the twelfth time T12*a*, and the thirteenth time T13*a* are differently set. For example, the twelfth time T12*a* may be set to be longer than the eleventh time T11*a*, and the thirteenth time T13*a* may be set to be longer than the twelfth time T12*a*. In this case, a predetermined time may be secured after the last first scan signal GW1*b* is supplied and before the first second scan signal GW2*b* is supplied, and this predetermined time may be used as the first IFP touch sensing period. In addition, a predetermined time may be secured after the last second scan signal GW2*b* is supplied before the first third scan signal GW3*b* is supplied, and this predetermined time may be used as the second IFP touch sensing period.

Meanwhile, in FIG. 5A, one IFP touch sensing period is included in one frame, and in FIG. 9A, two IPF touch sensing periods are included in one frame, but the disclosure is not limited thereto. For example, one frame may include three or more IFP touch sensing periods.

Figure 10:
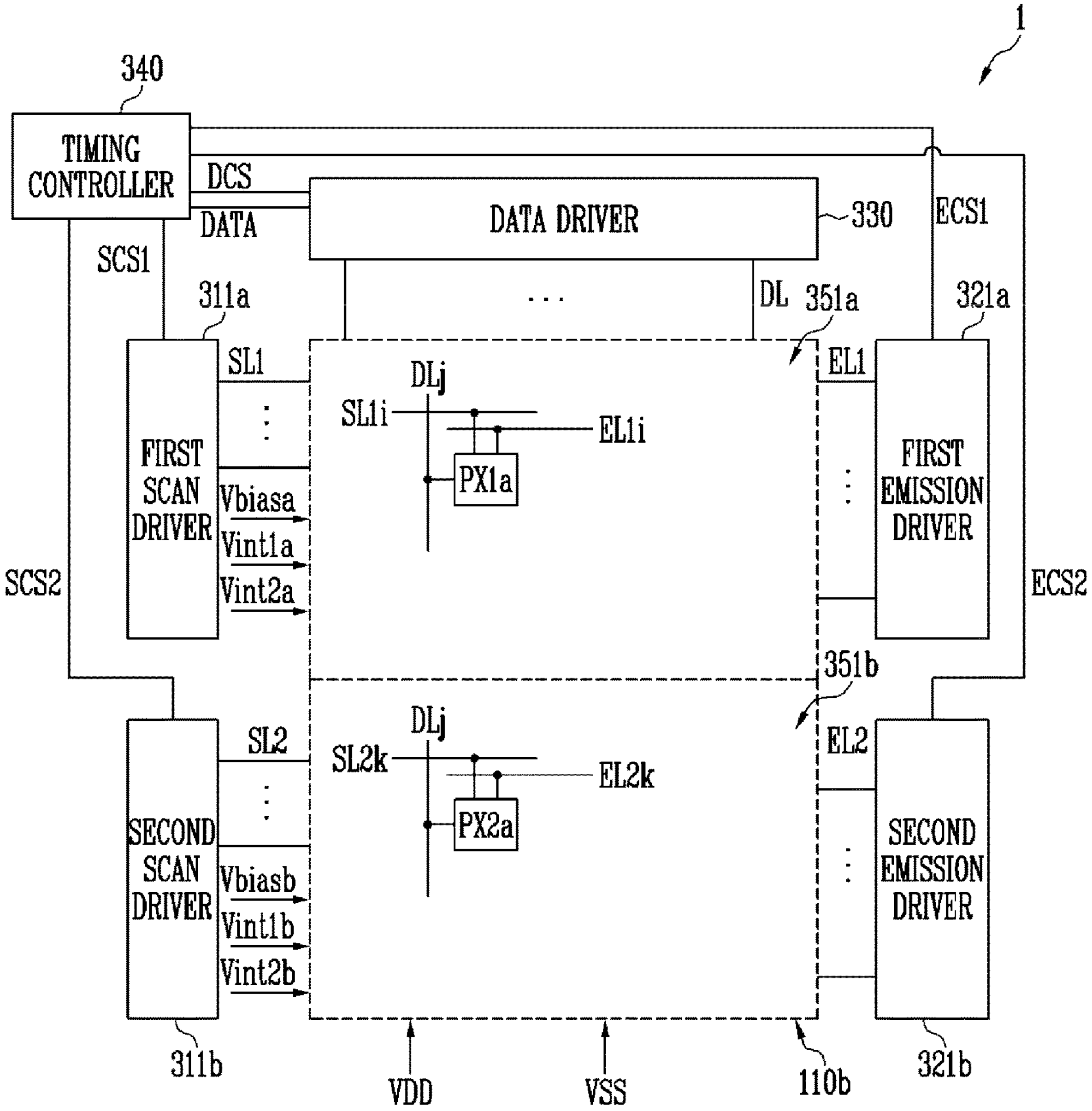
FIG. 10 is a diagram illustrating a configuration of a display unit according to still another embodiment of the disclosure.

FIG. 10 is a diagram illustrating a configuration of a display unit according to still another embodiment of the disclosure. In FIG. 10, a circuit structure of pixels PX1*a* and PX2*a* is different from that of FIG. 3, and other configurations may be substantially the same. Therefore, when describing FIG. 10, a detailed description of a configuration similar to that of FIG. 3 may be omitted.

Referring to FIG. 10, the display device 1 according to an embodiment of the disclosure includes a display unit 110*b*, drivers 311*a*, 311*b*, 321*a*, 321*b*, and 330, and the timing controller 340.

The display unit 110*b* includes first pixels PX1*a* positioned in a first area 351*a* that is one side of the panel and second pixels PX2*a* positioned in a second area 351*b* that is another side of the panel.

The first pixels PX1*a* are respectively connected to the first scan lines SL1, the first emission control lines EL1, and the data lines DL disposed in the first area 351*a*. The second pixels PX2*a* are respectively connected to the second scan lines SL2, the second emission scan line EL2, and the data lines DL disposed in the second area 351*b*.

In an embodiment, the first pixels PX1*a* may include a first light emitting element and a first driving transistor for controlling a current amount supplied to the first light emitting element. The second pixels PX2*a* may include a second light emitting element and a second driving transistor for controlling a current amount supplied to the second light emitting element. Circuit structures of the first pixels PX1*a* and the second pixels PX2*a* may be substantially the same.

Each of the first pixels PX1*a* and the second pixels PX2*a* may receive the first power VDD and the second power VSS from the outside. In addition, the first pixels PX1*a* may receive first initialization power Vint1*a* for initializing a gate electrode of the first driving transistor, second initialization power Vint2*a* for initializing a first electrode (for example, an anode electrode) of the first light emitting element, and first bias power Vbias*a* for setting the first driving transistor to a bias state.

In addition, the second pixels PX2*a* may receive third initialization power Vint1*b* for initializing a gate electrode of the second driving transistor, fourth initialization power Vint2*b* for initializing a first electrode (for example, an anode electrode) of the second light emitting element, and second bias power Vbias*b* for setting the second driving transistor to a bias state.

Here, the first initialization power Vint1*a* may be set to a voltage different from that of the third initialization power Vint1*b*, and the second initialization power Vint2*a* may be set to a voltage different from that of the fourth initialization power Vint2*b*. In addition, the first bias power Vbias*a* may be set to a voltage different from that of the second bias power Vbias*b*.

Describing in more detail, when the signals EM1, GW1, EM2, and GW2 are applied as shown in FIG. 5A, a luminance difference may occur between the first area 351*a* and the second area 351*b* due to an on-bias time difference of the driving transistor.

In an embodiment, the first driving transistor included in the first pixel PX1*a* is set to an on-bias state during a fourth time T4*a* after the data signal is supplied as shown in FIG. 5A. The second driving transistor included in the second pixel PX2*a* is set to an on-bias state during a fifth time T5*a* after the data signal is supplied. Here, the fourth time T4*a* is set to be longer than the fifth time T5*a*. In this case, a luminance of the first area 351*a* may be set to be lower than a luminance of the second area 351*b* in response to the data signal of the same grayscale.

In an embodiment of the disclosure, a voltage value of the first initialization power Vint1*a*, the second initialization power Vint2*a*, the first bias power Vbias*a*, the third initialization power Vint1*b*, the fourth initialization power Vint2*b*, and the second bias power Vbias*b* may be set so that the first area 351*a* and the second area 351*b* have the same luminance in response to the data signal of the same grayscale. For example, the voltage value of the first initialization power Vint1*a*, the second initialization power Vint2*a*, the first bias power Vbias*a*, the third initialization power Vint1*b*, the fourth initialization power Vint2*b*, and the second bias power Vbias*b* may be determined experimentally in consideration of an inch of the panel, resolution, and the like.

In an embodiment, a voltage absolute value of the first initialization power Vint1*a* may be set to be lower than a voltage absolute value of the third initialization power Vint1*b*. For example, when the first initialization power Vint1*a* is set to −3V, the third initialization power Vint1*b* may be set to −4V.

In an embodiment, a voltage absolute value of the second initialization power Vint2*a* may be set to be higher than a voltage absolute value of the fourth initialization power Vint2*b*. In addition, a voltage absolute value of the first bias power Vbias*a* may be set to be higher than a voltage absolute value of the second bias power Vbias*b*.

In another embodiment, only at least one voltage among the voltages of the first initialization power Vint1*a* and the third initialization power Vint1*b*, the voltages of the second initialization power Vint2*a* and the fourth initialization power Vint2*b*, and the voltages of the first bias power Vbias*a* and the second bias power Vbias*b* may be differently set.

For example, the first initialization power Vint1*a* and the third initialization power Vint1*b* may be set to the same voltage, the second initialization power Vint2*a* and the fourth initialization power Vint2*b* may be set to the same voltage, and the first bias power Vbias*a* and the second bias power Vbias*b* may be set to different voltages.

A first scan driver 311*a* may supply the first scan signal to the first scan lines SL1 positioned in the first area 351*a* in response to the first driving control signal SCS1 supplied from the timing controller 340.

A first emission driver 321*a* may supply the first emission control signal to the first emission control lines EL1 positioned in the first area 351*a* in response to the third driving control signal ECS1 supplied from the timing controller 340.

A second scan driver 311*b* may supply the second scan signal to the second scan lines SL2 positioned in the second area 351*b* in response to the second driving control signal SCS2 supplied from the timing controller 340.

A second emission driver 321*b* may supply the second emission control signal to the second emission control lines EL2 positioned in the second area 351*b* in response to the fourth driving control signal ECS2 supplied from the timing controller 340.

Figure 11:
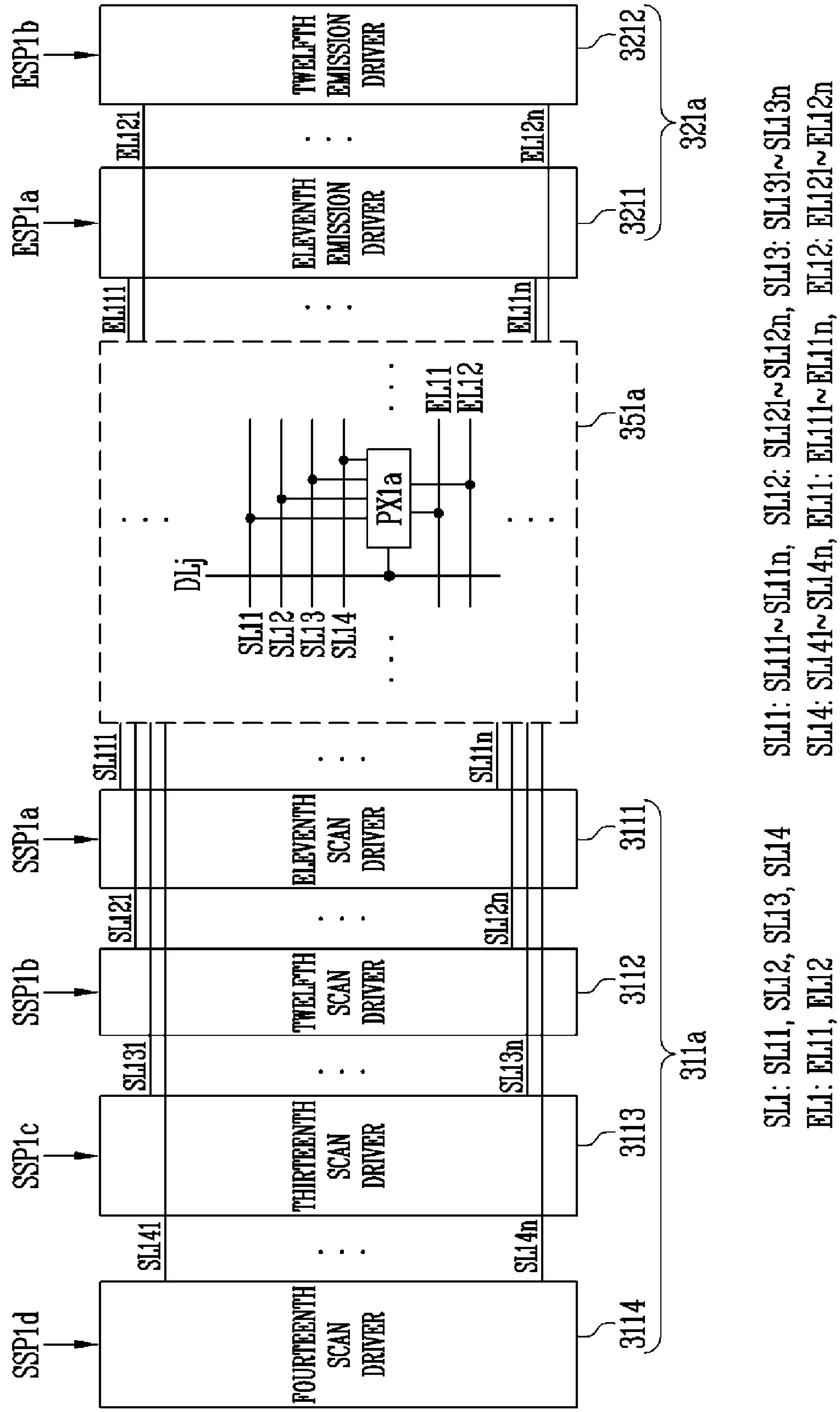
FIG. 11 is a diagram illustrating an embodiment of a first scan driver and a first emission driver shown in FIG. 10.

FIG. 11 is a diagram illustrating an embodiment of the first scan driver and the first emission driver shown in FIG. 10.

Referring to FIG. 11, the first scan driver 311*a* includes an eleventh scan driver 3111, a twelfth scan driver 3112, a thirteenth scan driver 3113, and a fourteenth scan driver 3114.

The first driving control signal SCS1 includes first scan start pulses SSP1*a*, SSP1*b*, SSP1*c*, and SSP1*d*. The first scan start pulses SSP1*a*, SSP1*b*, SSP1*c*, and SSP1*d* may be supplied to the eleventh scan driver 3111, the twelfth scan driver 3112, the thirteenth scan driver 3113, and the fourteenth scan driver 3114, respectively.

The eleventh scan driver 3111 may supply an eleventh scan signal to eleventh scan lines SL111 to SL11*n* in response to the first scan start pulse SSP1*a*. The twelfth scan driver 3112 may supply a twelfth scan signal to twelfth scan lines SL121 to SL12*n* in response to the first scan start pulse SSP1*b*. The thirteenth scan driver 3113 may supply a thirteenth scan signal to thirteenth scan lines SL131 to SL13*n* in response to the first scan start pulse SSP1*c*. The fourteenth scan driver 3114 may supply a fourteenth scan signal to fourteenth scan lines SL141 to SL14*n* in response to the first scan start pulse SSP1*d*.

The first emission driver 321*a* includes an eleventh emission driver 3211 and a twelfth emission driver 3212.

The third driving control signal ECS1 includes first emission start pulses ESP1*a* and ESP1*b*. The first emission start pulses ESP1*a* and ESP1*b* may be supplied to the eleventh emission driver 3211 and the twelfth emission driver 3212, respectively.

The eleventh emission driver 3211 may supply an eleventh emission control signal to eleventh emission control lines EL111 to EL11*n* in response to the first emission start pulse ESP1*a*. The twelfth emission driver 3212 may supply a twelfth emission control signal to twelfth emission control lines EL121 to EL12*n* in response to the first emission start pulse ESP1*b*.

The second scan driver 311*b* and the second emission driver 321*b* also have the same structure as the first scan driver 311*a* and the first emission driver 321*a*, and a detailed description thereof is omitted.

Figure 12:
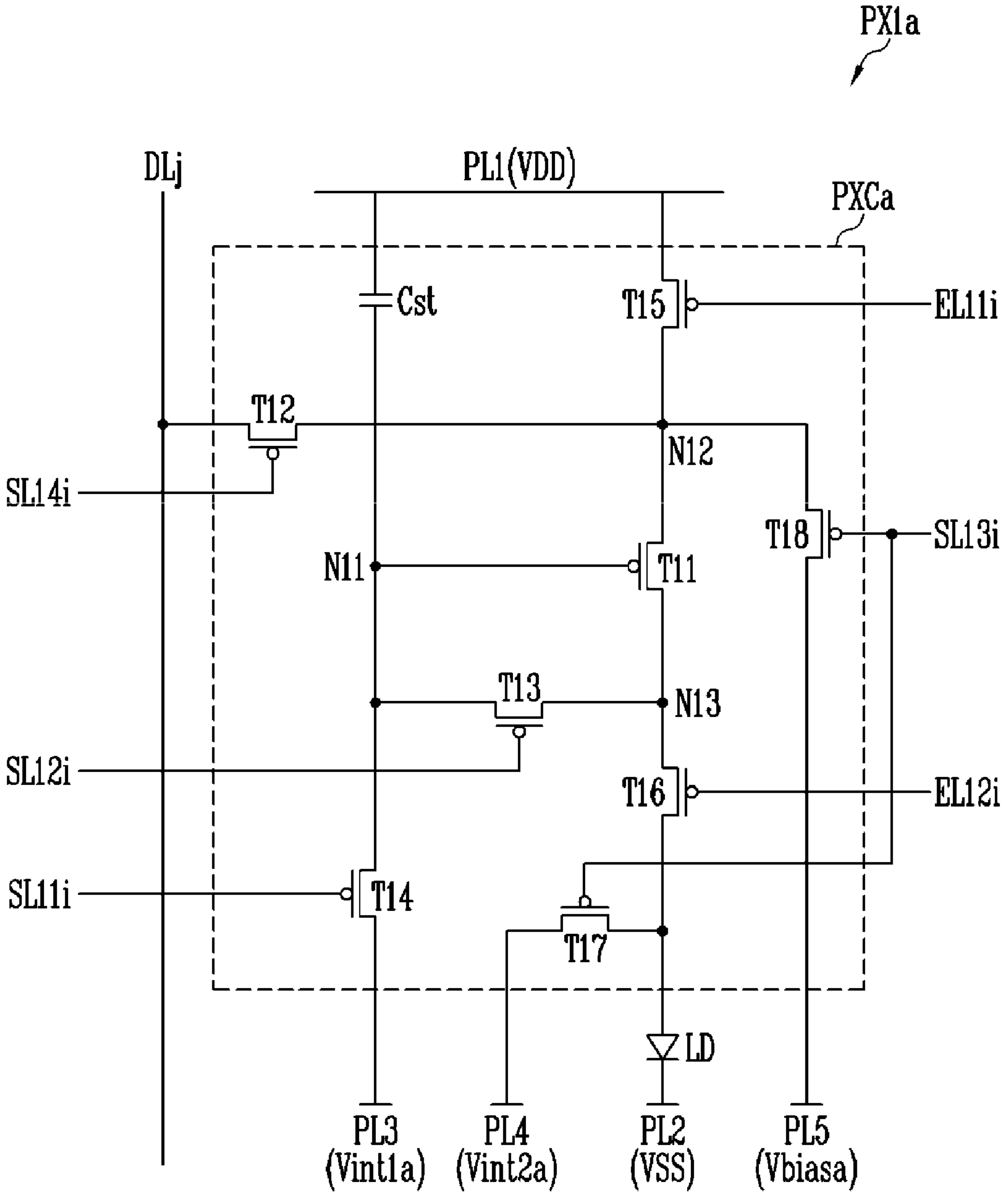
FIG. 12 is a diagram illustrating an embodiment of a first pixel shown in FIG. 10.

FIG. 12 is a diagram illustrating an embodiment of the first pixel shown in FIG. 10. FIG. 12 shows the first pixel PX1*a* disposed in the i-th row and the j-th column. The second pixel PX2*a* has substantially the same pixel structure as the first pixel PX1*a* except that the scan line and the emission control line connected to the first pixel PX1*a* are changed. Therefore, an additional description regarding the second pixel PX2*a* is omitted.

Referring to FIG. 12, the first pixel PX1*a* according to an embodiment of the disclosure includes a light emitting element LD (or a first light emitting element) and a pixel circuit PXC*a* for controlling a current amount supplied to the light emitting element LD.

The light emitting element LD may be connected between the first power line PL1 to which the first power VDD is supplied and the second power line PL2 to which the second power VSS is supplied. For example, a first electrode of the light emitting element LD is connected to the first power line PL1 via a sixteenth transistor T16, an eleventh transistor T11, and a fifteenth transistor T15, and a second electrode of the light emitting element LD is connected to the second power line PL2. The light emitting element LD may emit light with a luminance corresponding to the current amount supplied from the first transistor T1.

The light emitting element LD may be selected as an organic light emitting diode. In addition, the light emitting element LD may be selected as an inorganic light emitting diode such as a micro light emitting diode (LED) or a quantum dot light emitting diode. In addition, the light emitting element LD may be an element in which an organic material and an inorganic material are configured in combination. In FIG. 12, the first pixel PX1*a* includes a single light emitting element LD, but in another embodiment, the first pixel PX1*a* may include a plurality of light emitting elements LD, and the plurality of light emitting elements LD may be connected to each other in series, parallel, or series-parallel.

The pixel circuit PXC*a* includes the eleventh transistor T11 (or a first driving transistor), a twelfth transistor T12, a thirteenth transistor T13, a fourteenth transistor T14, the fifteenth transistor T15, the sixteenth transistor T16, a seventeenth transistor T17, an eighteenth transistor T18, and a storage capacitor Cst.

A first electrode of the eleventh transistor T11 is connected to a twelfth node N12, and a second electrode of the eleventh transistor T11 is connected to a thirteenth node N13. In addition, a gate electrode of the eleventh transistor T11 is connected to an eleventh node N11. The eleventh transistor T11 may control the current amount flowing from the first power VDD to the second power VSS via the light emitting element LD in response to a voltage of the eleventh node N11.

The twelfth transistor T12 is connected between the data line Dj and the twelfth node N12. In addition, a gate electrode of the twelfth transistor T12 is connected to a fourteenth scan line SL14*i*. The twelfth transistor T12 is turned on when a fourteenth scan signal is supplied to the fourteenth scan line SL14*i* to electrically connect the data line Dj and the twelfth node N12. Here, the fourteenth scan signal is supplied to be synchronized with the data signal, and may correspond to the scan signal GW1 of FIG. 5.

The thirteenth transistor T13 is connected between the second electrode (or a thirteenth node N13) and the gate electrode (or the eleventh node N11) of the eleventh transistor T11. In addition, a gate electrode of the thirteenth transistor T13 is connected to a twelfth scan line SL12*i*. The thirteenth transistor T13 is turned on when a twelfth scan signal is supplied to the twelfth scan line SL12*i* to electrically connect the eleventh node N11 and the thirteenth node N13. When the eleventh node N11 and the thirteenth node N13 are electrically connected, the eleventh transistor T11 is connected in a diode form.

The fourteenth transistor T14 may be connected between the eleventh node N11 and a third power line PL3 to which the voltage of the first initialization power Vint1*a* is supplied. In addition, a gate electrode of the fourteenth transistor T14 is connected to the eleventh scan line SL11*i*. The fourteenth transistor T14 is turned on when the eleventh scan signal is supplied to the eleventh scan line SL11*i* to supply the voltage of the first initialization power Vint1*a* to the eleventh node N11.

The fifteenth transistor T15 is connected between the first power line PL1 and the first electrode (or the twelfth node N12) of the eleventh transistor T11. In addition, a gate electrode of the fifteenth transistor T15 is connected to an eleventh emission control line EL11*i*. The fifteenth transistor T15 is turned off when the eleventh emission control signal is supplied to the eleventh emission control line EL11*i*, and is turned on in other cases.

The sixteenth transistor T16 is connected between the thirteenth node N13 and the first electrode (or the anode electrode) of the light emitting element LD. In addition, a gate electrode of the sixteenth transistor T16 is connected to a twelfth emission control line EL12*i*. The sixteenth transistor T16 is turned off when the twelfth emission control signal is supplied to the twelfth emission control line EL12*i*, and is turned on in other cases.

Meanwhile, the eleventh emission control signal and/or the twelfth emission control signal are/is sequentially supplied along the pixel row, and may correspond to the emission control signal EM1 of FIG. 5. Additionally, the eleventh emission control signal and the twelfth emission control signal are described as separate signals, but the disclosure is not limited thereto. For example, the eleventh emission control signal and the twelfth emission control signal may be set as the same emission control signal. In this case, the gate electrodes of the fifteenth transistor T15 and the sixteenth transistor T16 may be connected to the same emission control line EL11*i* or EL12*i*.

The seventeenth transistor T17 is connected between a fourth power line PL4 to which the second initialization power Vint2*a* is supplied and the first electrode of the light emitting element LD. In addition, a gate electrode of the seventeenth transistor T17 is connected to a thirteenth scan line SL13*i*. The seventh transistor T17 is turned on when a thirteenth scan signal is supplied to the thirteenth scan line SL13*i* to supply the voltage of the second initialization power Vint2*a* to the first electrode of the light emitting element LD.

The eighteenth transistor T18 is connected between a fifth power line PL5 to which the voltage of the first bias power Vbias*a* is supplied and the twelfth node N12. In addition, a gate electrode of the eighteenth transistor T18 is connected to the thirteenth scan line SL13*i*. The eighteenth transistor T18 is turned on when the thirteenth scan signal is supplied to the thirteenth scan line SL13*i* to supply the voltage of the first bias power Vbias*a* to the twelfth node N12.

The storage capacitor Cst is connected between the first power line PL1 and the eleventh node N11. The storage capacitor Cst stores a voltage applied to the eleventh node N11.

Meanwhile, in FIG. 12, the transistors T11 to T18 included in the first pixel PX1*a* are shown as P-type transistors, but the disclosure is not limited thereto. For example, the first pixel PX1*a* may include at least one N-type transistor. Here, the N-type transistor may be an oxide thin film transistor. For example, the oxide thin film transistor may be a low temperature polycrystalline oxide (LTPO) thin film transistor. However, this is an example, and the disclosure is not limited thereto. For example, an active pattern (semiconductor layer) included in the transistors may include an inorganic semiconductor (for example, amorphous silicon or poly silicon), an organic semiconductor, or the like. However, this is an example, and types and kinds of the transistors are not limited to the above-described examples.

Briefly describing an operation process, first, the eleventh emission control signal is supplied to the eleventh emission control line EL11*i* and/or the twelfth emission control signal is supplied to the twelfth emission control line EL12*i*, and thus the fifteenth transistor T15 and/or the sixteenth transistor T16 are/is turned off. When the fifteenth transistor T15 and/or the sixteenth transistor T16 are/is turned off, the first pixel PX1*a* is set to a non-emission state.

Thereafter, the eleventh scan signal is supplied to the eleventh scan line SL11*i*, and thus the fourteenth transistor T14 is turned on. When the fourteenth transistor T14 is turned on, the voltage of the first initialization power Vint1*a* may be supplied to the eleventh node N11, and thus a voltage of the gate electrode of the eleventh transistor T11 may be initialized.

Thereafter, the twelfth scan signal is supplied to the twelfth scan line SL12*i*, and thus the thirteenth transistor T13 is turned on. The fourteenth scan signal is supplied to the fourteenth scan line SL14*i*, and thus the twelfth transistor T12 is turned on. When the thirteenth transistor T13 is turned on, the eleventh node N11 and the thirteenth node N13 are electrically connected. When the twelfth transistor T12 is turned on, the data line Dj and the twelfth node N12 are electrically connected. Then, the data signal from the data line Dj is supplied to the eleventh node N11 via the twelfth node N12, the eleventh transistor T11, the thirteenth node N13, and the thirteenth transistor T13. At this time, the storage capacitor Cst stores a voltage corresponding to the data signal applied to the eleventh node N11 and a threshold voltage of the eleventh transistor T11.

Thereafter, the third scan signal is supplied to the thirteenth scan line SL13*i*, and thus the seventeenth transistor T17 and the eighteenth transistor T18 are turned on. When the seventeenth transistor T17 is turned on, the voltage of the second initialization power Vint2*a* is supplied to the first electrode of the light emitting element LD, and thus the first electrode of the light emitting element LD is initialized to the voltage of the second initialization power Vint2*a*. When the eighteenth transistor T18 is turned on, the voltage of the first bias power Vbias*a* is supplied to the twelfth node N12, and thus the eleventh transistor T11 is initialized to a bias state (for example, on bias).

Thereafter, supply of the eleventh emission control signal to the eleventh emission control line EL11*i* and the twelfth emission control signal to the twelfth emission control line EL12*i* is stopped, and thus the fifteenth transistor T15 and the sixteenth transistor T16 are turned on. At this time, the eleventh transistor T11 supplies a predetermined current corresponding to the voltage of the eleventh node N11 to the light emitting element LD, and thus the light emitting element LD generates light of a predetermined luminance.

Meanwhile, in the disclosure, a driving method of the first pixel PX1*a* is not limited to the above-described method. For example, the first pixel PX1*a* may be driven in various currently known driving methods.

Although the above has been described with reference to the embodiments of the disclosure, those skilled in the art will understand that the disclosure may be variously corrected and modified within the scope without departing from the spirit and scope of the disclosure described in the claims.

What is claimed is:

1. A display device comprising:

a plurality of first pixels positioned in a first area of a panel, each of the first pixel receiving a first data signal from a data line in response to a first scan signal supplied from a first scan line and having an emission time controlled according to a first emission control signal; and a plurality of second pixels positioned in a second area of the panel, each of the second pixel receiving a second data signal from the data line in response to a second scan signal supplied from a second scan line and having an emission time controlled by a second emission control signal, wherein each of the first pixels receives the first data signal after a first time after the first emission control signal is supplied, and each of the second pixels receives the second data signal after a second time, which is different from the first time, after the second emission control signal is supplied.

2. The display device according to claim 1, wherein a duration of the second time is set to be longer than a duration of the first time.

3. The display device according to claim 1, wherein the first emission control signal and the second emission control signal are sequentially supplied.

4. The display device according to claim 3, further comprising:

a first emission driver sequentially supplying the first emission control signal to the first pixels through first emission control lines positioned in the first area with a predetermined time difference; and a second emission driver sequentially supplying the second emission control signal to the second pixels through second emission control lines positioned in the second area with the predetermined time difference.

5. The display device according to claim 4, wherein a first emission control signal supplied to a last first emission control line positioned in the first area and a second emission control signal supplied to a first second emission control line positioned in the second area are sequentially supplied with the predetermined time difference.

6. The display device according to claim 1, further comprising:

a first scan driver supplying the first scan signal to a first scan line connected to each of the first pixels; and a second scan driver supplying the second scan signal to a second scan line connected to each of the second pixels.

7. The display device according to claim 1, wherein a predetermined period after the first data signal is supplied to the first pixels positioned in the first area and before the second data signal is supplied to the second pixels positioned in the second area is an inter frame pause (IFP) touch sensing period.

8. The display device according to claim 1, further comprising:

a plurality of third pixels positioned in a third area of the panel, each of the third pixel receiving a third data signal from the data line in response to a third scan signal supplied to a third scan line and having an emission time controlled by a third emission control signal, wherein each of the third pixels receives the third data signal after a third time different from the first time and the second time after the third emission control signal is supplied.

9. The display device according to claim 8, wherein a duration of the third time is set to be longer than durations of the first time and the second time.

10. The display device according to claim 8, wherein the first emission control signal, the second emission control signal, and the third emission control signal are sequentially supplied with a predetermined time difference.

11. The display device according to claim 1, wherein each of the first pixels and the second pixels includes:

a light emitting element positioned between a first power line to which first power is supplied and a second power line to which second power is supplied;

a first transistor connected between the first power line and a first electrode of the light emitting element and controlling a current amount flowing from the first power to the second power via the light emitting element in response to a voltage of a gate electrode;

a second transistor connected between the data line and the gate electrode of the first transistor and turned on when the first scan signal or the second scan signal is supplied; and a third transistor positioned in a current path between the first power line and the second power line, turned off when the first emission control signal or the second emission control signal is supplied, and turned on in other cases.

12. The display device according to claim 1, wherein each of the first pixels includes a first light emitting element and a first driving transistor and receives a voltage of first initialization power for initializing a gate electrode of the first driving transistor, a voltage of second initialization power for initializing a first electrode of the first light emitting element, and a voltage of first bias power for setting the first driving transistor to a bias state.

13. The display device according to claim 12, wherein each of the second pixels includes a second light emitting element and a second driving transistor and receives a voltage of third initialization power for initializing a gate electrode of the second driving transistor, a voltage of fourth initialization power for initializing a first electrode of the second light emitting element, and a voltage of second bias power for setting the second driving transistor to a bias state.

14. The display device according to claim 13, wherein the voltage of the first initialization power is different from the voltage of the third initialization power, the voltage of the second initialization power is different from the voltage of the fourth initialization power, and the voltage of the first bias power is different from the voltage of the second bias power.

15. The display device according to claim 14, wherein an absolute value of the voltage of the first initialization power is set to be lower than an absolute value of the voltage of the third initialization power, an absolute value of the voltage of the second initialization power is set to be higher than an absolute value of the voltage of the fourth initialization power, and an absolute value of the voltage of the first bias power is set to be higher than an absolute value of the voltage of the second bias power.

16. A display device comprising:

a plurality of first pixels positioned on one side of a panel, each of the first pixel receiving a first data signal after a first time after a first emission control signal is supplied; and a plurality of second pixels disposed on another side of the panel, each of the second pixel receiving a second data signal after a second time, which is different from the first time, after a second emission control signal is supplied.

17. A method of driving a display device, the method comprising steps of:

supplying a first scan signal after a first time after a first emission control signal for turning off emission is supplied to each of first pixels positioned on one side of a panel; and supplying a second scan signal after a second time, which is different from the first time, after a second emission control signal for turning off emission is supplied to each of second pixels positioned on another side of the panel.

18. The method according to claim 17, wherein a duration of the second time is set to be longer than a duration of the first time.

19. The method according to claim 17, wherein first emission control signals supplied to the one side of the panel and second emission control signals supplied to the other side of the panel are sequentially supplied with a predetermined time difference.

20. The method according to claim 17, wherein a predetermined period after the first scan signal is supplied to the first pixels and before the second scan signal is supplied to the second pixels is an IFP touch sensing period.

* * * * *